(12) United States Patent
Miyata et al.

(10) Patent No.: US 9,852,676 B2
(45) Date of Patent: Dec. 26, 2017

(54) LIQUID CRYSTAL DISPLAY DEVICE

(71) Applicant: Sharp Kabushiki Kaisha, Sakai-shi, Osaka (JP)

(72) Inventors: Hidekazu Miyata, Sakai (JP); Iori Aoyama, Sakai (JP); Yuichi Kita, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/114,152

(22) PCT Filed: Dec. 15, 2014

(86) PCT No.: PCT/JP2014/083101
§ 371 (c)(1),
(2) Date: Jul. 26, 2016

(87) PCT Pub. No.: WO2015/114970
PCT Pub. Date: Aug. 6, 2015

(65) Prior Publication Data
US 2017/0011680 A1    Jan. 12, 2017

(30) Foreign Application Priority Data
Jan. 30, 2014  (JP) .................... 2014-015972

(51) Int. Cl.
*G09G 3/36*  (2006.01)
*G09G 3/20*  (2006.01)
(Continued)

(52) U.S. Cl.
CPC ........ *G09G 3/2018* (2013.01); *G02F 1/1339* (2013.01); *G02F 1/1368* (2013.01);
(Continued)

(58) Field of Classification Search
CPC .. G09G 3/2018; G09G 3/2003; G09G 3/3607; G09G 3/3614; G09G 3/6483;
(Continued)

(56) References Cited

U.S. PATENT DOCUMENTS 6,175,351 B1   1/2001  Matsuura et al.
8,334,882 B2 * 12/2012  Yoshida ............... G09G 3/3648
                                                                345/690
(Continued)

FOREIGN PATENT DOCUMENTS

JP     1-56143 A      3/1995
JP     2002-365657 A  12/2002
(Continued)

OTHER PUBLICATIONS

Official Communication issued in International Patent Application No. PCT/JP2014/083101, dated Mar. 3, 2015.
(Continued)

*Primary Examiner* — Lun-Yi Lao
*Assistant Examiner* — Jarurat Suteerawongsa
(74) *Attorney, Agent, or Firm* — Keating & Bennett, LLP

(57) ABSTRACT

An active matrix substrate (12A) of a liquid crystal display device (10) includes: drive electrodes (32A, 32B) a pair of which are arranged in each pixel; pixel electrodes (36) each of which is provided in each pixel; first switching elements (34A) each of which is connected to one of the pair of drive electrode (32A); second switching elements (34B) each of which is connected to the other drive electrode (32B); third switching elements (34C) connected to the pixel electrodes (36); first source lines (30A) connected to the group of the first switching elements (34); second source lines (30B) connected to the group of the second switching elements
(Continued)

(34B); third source lines (30C) connected to the group of the third switching elements (30C); and a plurality of gate lines (28).

10 Claims, 19 Drawing Sheets

(51) Int. Cl.
*G02F 1/1343* (2006.01)
*G02F 1/1362* (2006.01)
*G02F 1/1339* (2006.01)
*G02F 1/1368* (2006.01)

(52) U.S. Cl.
CPC .... *G02F 1/13624* (2013.01); *G02F 1/134309* (2013.01); *G02F 1/134336* (2013.01); *G02F 1/134363* (2013.01); *G02F 1/136286* (2013.01); *G09G 3/2003* (2013.01); *G09G 3/3607* (2013.01); *G09G 3/3614* (2013.01); *G09G 3/3648* (2013.01); *G09G 3/3685* (2013.01); *G09G 3/3696* (2013.01); *G02F 2001/134372* (2013.01); *G02F 2201/123* (2013.01); *G09G 2300/0426* (2013.01); *G09G 2300/0434* (2013.01); *G09G 2300/0443* (2013.01); *G09G 2300/0465* (2013.01); *G09G 2300/0478* (2013.01); *G09G 2310/0235* (2013.01); *G09G 2310/08* (2013.01); *G09G 2320/0252* (2013.01); *G09G 2320/0271* (2013.01); *G09G 2320/0626* (2013.01)

(58) Field of Classification Search
CPC ............... G09G 3/3685; G09G 3/3696; G09G 23/0426; G09G 2300/0434; G09G 2300/0443; G09G 2300/0465; G09G 2300/0478; G09G 10/0235; G09G 2310/08; G09G 2320/0252; G09G 2320/0271; G09G 2320/0626; G09G 3/36; G02F 1/1339; G02F 1/134309; G02F 1/134336; G02F 1/134363; G02F 1/13624; G02F 1/136286; G02F 1/1368; G02F 2001/134372; G02F 2201/123
See application file for complete search history.

(56) References Cited

U.S. PATENT DOCUMENTS

2005/0253797 A1* 11/2005 Kamada ............ G02F 1/133753
345/89
2014/0264330 A1 9/2014 Iyama et al.

FOREIGN PATENT DOCUMENTS

| JP | 2004-354407 A | 12/2004 |
| JP | 2007-101972 A | 4/2007 |
| JP | 3900859 B2 | 4/2007 |
| WO | 2013/065529 A1 | 5/2013 |

OTHER PUBLICATIONS

Iwata et al., "Novel Super-Fast-Response, Ultra-Wide Temperature Range VA-LCD", SID 2013 Digest, 2013, pp. 431-434.

* cited by examiner

|  | Positive polarity | | | Negative polarity | | |
|---|---|---|---|---|---|---|
| Display gray level value | Drive electrode 32A | Drive electrode 32B | Pixel electrode 36 | Drive electrode 32A | Drive electrode 32B | Pixel electrode 36 |
| 0 | 15.07 | 15.74 | 15.07 | 1.59 | 0.74 | 1.59 |
| 1 | 15.05 | 15.71 | 15.07 | 1.60 | 0.76 | 1.59 |
| 2 | 15.04 | 15.68 | 15.07 | 1.61 | 0.79 | 1.58 |
| ⋮ | ⋮ | ⋮ | | ⋮ | ⋮ | |
| 253 | 8.59 | 11.79 | 15.83 | 8.11 | 4.70 | 0.87 |
| 254 | 8.47 | 11.76 | 15.84 | 8.23 | 4.73 | 0.86 |
| 255 | 8.35 | 11.73 | 15.85 | 8.35 | 4.76 | 0.85 |

Fig. 13

| Source driver input data value | Positive polarity output voltage (V) | Negative polarity output voltage (V) |
|---|---|---|
| 0 | 8.35 | 8.35 |
| 1 | 8.47 | 8.23 |
| 2 | 8.59 | 8.11 |
| ⋮ | ⋮ | ⋮ |
| 253 | 15.68 | 0.79 |
| 254 | 15.71 | 0.76 |
| 255 | 15.74 | 0.74 |

Fig. 14

| Display gray level value | Source driver input data value | | |
|---|---|---|---|
| | Drive electrode 32A | Drive electrode 32B | Pixel electrode 36 |
| 0 | 210 | 250 | 210 |
| 1 | 209 | 249 | 210 |
| 2 | 208 | 248 | 210 |
| 253 | 2 | 66 | 253 |
| 254 | 1 | 65 | 254 |
| 255 | 0 | 64 | 255 |

Fig. 15

LIQUID CRYSTAL DISPLAY DEVICE

TECHNICAL FIELD

The present invention relates to a liquid crystal display device, and more specifically relates to a liquid crystal display device that controls the alignment of liquid crystal molecules by using a vertical electric field and a horizontal electric field in combination.

BACKGROUND ART

As a mode of operating liquid crystal in a liquid crystal display device, there are an operation mode utilizing a vertical electric field, and an operation mode utilizing a horizontal electric field. The vertical electric field is generated between a pair of substrates arranged so that a liquid crystal layer is interposed therebetween. The horizontal electric field is generated between electrodes provided in one of a pair of substrates arranged so that a liquid crystal layer is interposed therebetween. The operation mode utilizing the vertical electric field is, for example, the twisted nematic (TN) mode, or the vertical alignment (VA) mode. The operation mode utilizing the horizontal electric field is, for example, the in-plane switching (IPS) mode.

Further, in recent years, a liquid crystal display device that controls the alignment of liquid crystal molecules by using the vertical electric field and the horizontal electric field in combination has been proposed. Patent Document 1 indicated below describes a configuration in which an alignment state of liquid crystal during a rising response time is controlled by using the vertical electric field, and an alignment state of liquid crystal during a falling response time is controlled by using the horizontal electric field. Patent Document 2 indicated below discloses a configuration in which liquid crystal is driven by using the horizontal electric field during an image display period, and the liquid crystal is driven by using the vertical electric field at an initial stage during an image non-display period. Patent Document 3 indicated below discloses a liquid crystal device in which the horizontal electric field is applied when a state in which the vertical electric field is applied is switched to a state in which the vertical electric field is not applied.

Still further, Non-patent Document 1 indicated below proposes a configuration in which the vertical electric field and the horizontal electric field are applied to a liquid crystal layer simultaneously, using four electrodes. Non-patent Document 1 describes the V-IP driving mode, in which the horizontal electric field and the vertical electric field are simultaneously applied to liquid crystal so that the alignment of liquid crystal molecules is forcibly controlled. This enables fast response even at a low temperature.

PRIOR ART DOCUMENT

Patent Document

Patent Document 1: JP-A-2007-101972
Patent Document 2: JP-A-2004-354407
Patent Document 3: Japanese Patent No. 3900859

Non-Patent Document

Non-patent Document 1: DIGEST of SID 2013, pp 431-434, (34.1), Y. Iwata et al. "Novel Super-Fast-Response, Ultra-Wide Temperature Range VA-LCD"

SUMMARY OF THE INVENTION

Problem to be Solved by the Invention

In a case of a liquid crystal display device that controls the alignment of liquid crystal molecules by using the vertical electric field and the horizontal electric field in combination, as is the case with the above-described prior art, the horizontal electric field in a pixel is formed by a potential difference between a pair of electrodes formed on one of glass substrates. The horizontal electric fields, therefore, cannot be uniform in the glass substrate normal line direction in the liquid crystal layer between the glass substrates. Since the horizontal electric fields are not uniform in the glass substrate normal line direction in the pixel, when a certain vertical electric field and a certain horizontal electric field are applied, the liquid crystal molecules in the liquid crystal layer in the pixel have the several stable states regarding the alignment direction, depending on the balance between the vertical electric field and the horizontal electric field, in some cases. In a case where there are several stable states, the transmittance with respect to the applied voltage is not in one-to-one correspondence, which makes it impossible to perform accurate gradation display. The present application discloses a liquid crystal display device that is capable of controlling balance between the vertical electric field and the horizontal electric field so as to perform more accurate gradation display.

Means to Solve the Problem

A liquid crystal display device in an embodiment of the present invention includes: an active matrix substrate having a display region in which a plurality of pixel arrays are arranged, each pixel array being formed with a plurality of pixels aligned; a counter substrate arranged so as to be opposed to the active matrix substrate; and a liquid crystal layer sealed between the active matrix substrate and the counter substrate. The active matrix substrate includes: drive electrodes a pair of which are arranged in each pixel on an insulating layer; pixel electrodes each of which is provided in each pixel on a side opposite to the pair of drive electrodes, with the insulating layer being interposed therebetween; first switching elements each of which is connected to one of the pair of drive electrodes in each pixel; second switching elements each of which is connected to the other of the pair of the drive electrodes in each pixel; third switching elements each of which is connected to the pixel electrode in each pixel; first source lines each of which is provided in each pixel array, the first source line being connected to a group of the first switching elements of a group of the pixels included in each pixel array; second source lines each of which is provided in each pixel array, the second source line being connected to a group of the second switching elements of the group of the pixels included in each pixel array; third source lines each of which is provided in each pixel array, the third source line being connected to a group of the third switching elements of the group of the pixels included in each pixel array; and a plurality of gate lines that supply a control signal to the first switching element, the second switching element, and the third switching of each pixel. The counter substrate includes a counter electrode arranged so as to be opposed to the pixel electrode and the pair of drive electrodes.

Effect of the Invention

In the liquid crystal display device in the embodiment of the present invention, the balance between the vertical electric field and the horizontal electric field can be controlled.

BRIEF DESCRIPTION OF DRAWINGS

FIG. 13 is a table illustrating exemplary voltage values of respective electrodes with respect to display gray level values that are set as illustrated in FIG. 10 or 12.

FIG. 14 is a table illustrating exemplary output voltage values with respect to source driver input data values (8 bits).

FIG. 15 is a table illustrating exemplary contents of an LUT.

MODE FOR CARRYING OUT THE INVENTION

Figure 1:
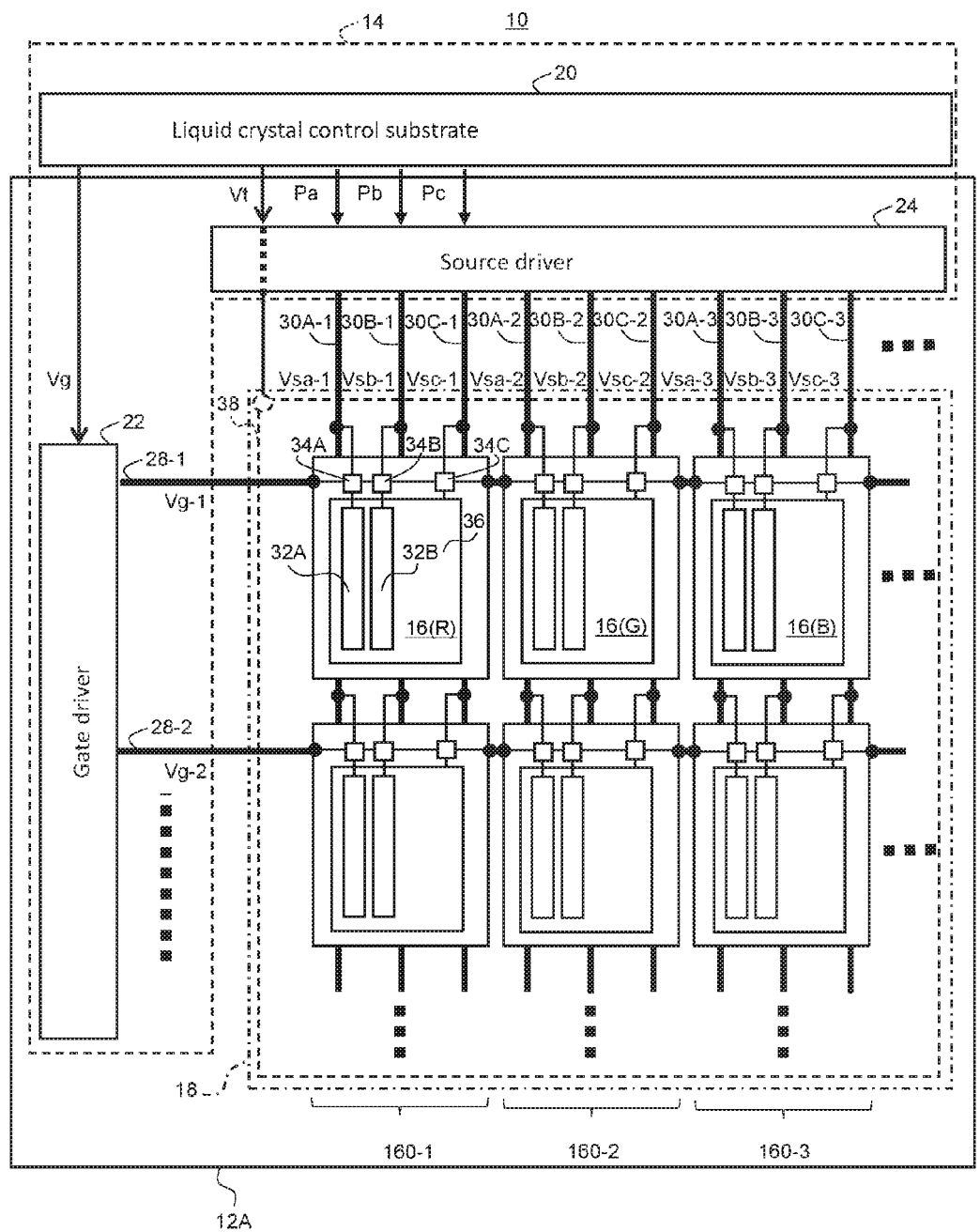
FIG. 1 is a schematic diagram illustrating an exemplary configuration of a liquid crystal display device 10 according to Embodiment 1.

A liquid crystal display device according to an embodiment of the present invention includes: an active matrix substrate having a display region in which a plurality of pixel arrays are arranged, each pixel array being formed with a plurality of pixels aligned; a counter substrate arranged so as to be opposed to the active matrix substrate; and a liquid crystal layer sealed between the active matrix substrate and the counter substrate. The active matrix substrate includes: drive electrodes a pair of which are arranged in each pixel on an insulating layer; pixel electrodes each of which is provided in each pixel on a side opposite to the pair of drive electrodes, with the insulating layer being interposed therebetween; first switching elements each of which is connected to one of the pair of drive electrodes in each pixel; second switching elements each of which is connected to the other of the pair of the drive electrodes in each pixel; third switching elements each of which is connected to the pixel electrode in each pixel; first source lines each of which is provided in each pixel array, the first source line being connected to a group of the first switching elements of a group of the pixels included in each pixel array; second source lines each of which is provided in each pixel array, the second source line being connected to a group of the second switching elements of the group of the pixels included in each pixel array; third source lines each of which is provided in each pixel array, the third source line being connected to a group of the third switching elements of the group of the pixels included in each pixel array; and a plurality of gate lines that supply a control signal to the first switching element, the second switching element, and the third switching of each pixel. The counter substrate includes a counter electrode arranged so as to be opposed to the pixel electrode and the pair of drive electrodes.

In the above-described configuration, for each pixel, a pair of drive electrodes arranged on an insulating layer, and a pixel electrode are provided. With this configuration, a horizontal electric field occurs in a case where the pair of drive electrodes have a potential difference therebetween, and a vertical electric field occurs in a case where the pixel electrode and the counter electrode have a potential difference therebetween. The pair of drive electrodes and the pixel electrode are connected to the first to third source lines via the first to third switching elements, respectively. The three source lines, i.e., the first to third source lines, are provided with respect to one pixel array. This makes it possible to apply individual voltage values via the first to third switching elements and the first to third source lines to the pair of the drive electrodes and the pixel electrode of each pixel. In other words, respective voltages of the pair of drive electrodes and the pixel electrode can be controlled. This makes it possible to finely control the horizontal electric field occurring between the pair of drive electrodes, and the vertical electric field caused by the pixel electrode and the counter electrode. As a result, this makes it possible to control the orientations of the electric fields applied to the liquid crystal accurately with a good balance. This further makes it possible to control the transmittance of the liquid crystal layer with high accuracy.

The above-described liquid crystal display device further includes a control unit that causes the display region to display an image. With respect to each pixel, the control unit independently supplies a voltage corresponding to a gray level to be displayed on the pixel, via the first source line, the second source line, and the third source line, to the pair of drive electrodes and the pixel electrode. With this configuration, the control unit can finely control the horizontal electric field occurring between the pair of drive electrodes, and the vertical electric field caused by the pixel electrode and the counter electrode, thereby applying an electric field suitable for displaying a desired gray level at each pixel, to the liquid crystal layer.

In the above-described liquid crystal display device, the control unit can include a convertor that generates voltage values corresponding to voltages to be applied to the pair of drive electrodes and the pixel electrode in each pixel, based on a display gray level value indicating a gray level to be displayed on each pixel. By the convertor, respective voltage values for the pair of drive electrodes and the pixel electrode that contribute to generation of an electric field for obtaining a gray level to be displayed are set appropriately. Here, the voltage value generated by the convertor may be a voltage itself to be applied, or may be a voltage signal value that indicates the voltage to be applied. A voltage signal value is, for example, a value used for generating a voltage to be applied. In this way, the voltage value generated by the convertor can be a voltage or a voltage signal value.

The control unit may include a conversion value recording section that records all gray level values that indicate all gray levels that can be displayed on the pixel, voltage values of the pair of drive electrodes corresponding to all the gray level values, and voltage values of the pixel electrode corresponding to all the gray level values. The convertor determines respective voltage values of the pair of drive electrodes corresponding to the display gray level value, and a voltage value of the pixel electrode corresponding to the display gray level value, by referring to the conversion value recording section. With this configuration, when receiving a display gray level value of one pixel, the convertor can appropriately set respective voltage values of the pair of drive electrodes and a voltage value of the pixel electrode corresponding to the display gray level value.

The convertor can include: a drive electrode voltage generation circuit that outputs a voltage value that serves as a reference value for the voltage values of the pair of drive electrodes corresponding to the display gray level value; and a pixel electrode voltage generation circuit that outputs a voltage value that serves as a reference value for the voltage value of the pixel electrode corresponding to the display gray level value. This allows the convertor to appropriately generate and output respective voltage values of the pair of drive electrodes and a voltage value of the pixel electrode corresponding to the display gray level value of one pixel.

The convertor can generate the voltage values in such a manner that at least one of the voltage value of one of the pair of drive electrodes, the voltage value of the other one of the pair of drive electrodes, and the voltage value of the pixel electrode is constant in a part of a range of all the gray levels that can be displayed by the pixel. For example, the convertor classifies all the gray levels that can be displayed on the pixel, into several consecutive ranges, then in each range, specifies a voltage value for one of the pair of drive electrodes, a voltage value for the other of the pair of drive electrodes, or a voltage value for the pixel electrode, and adjusts the voltage value thus specified, thereby determining the voltage signal value in the range. This makes it possible to easily obtain a gray level value for obtaining a desired display output luminance at each gray level. As a result, this makes gradation change of the display output luminance smooth, that is, allows the gradation change to match the γ curve of γ=2.2.

Two of the first source lines, two of the second source lines, and two of the third source lines may be provided for each pixel array. The two first source lines in each pixel array are connected to two adjacent ones of the pixels in the pixel array, respectively, and voltages having different polarities are input simultaneously to the two first source lines, respectively. The two second source lines in each pixel array are connected to two adjacent ones of the pixels in the pixel array, respectively, and voltages having different polarities are input simultaneously to the two second source lines, respectively. The two third source lines in each pixel array are connected to two adjacent ones of the pixels in the pixel array, respectively, and voltages having different polarities are input simultaneously to the two third source lines, respectively. Besides, two adjacent gate lines corresponding to the pixel array can be selected simultaneously. With this configuration, when driving is performed in such a manner that two pixels adjacent in in each pixel array have different voltage polarities, the driving can be such that during one frame period, the polarities of the voltages of the first to the third source lines are not reversed.

The configuration may be such that voltages having different polarities may be simultaneously input to two adjacent lines, respectively, among the two first source lines, the two second source lines, and the two third source lines provided in each pixel array. Further, voltages having different polarities may be simultaneously input to the first source lines of two adjacent pixels, respectively, the two pixels being adjacent in a direction perpendicular to the direction in which the first source lines extend.

The control unit may time-divide one frame period, and switch and display images in different colors in each period thus time-divided.

The first switching element, the second switching element, and the third switching element can be formed with thin film transistors. Each of the thin film transistors can include a semiconductor layer that includes an oxide semiconductor provided at a position opposed to the electrode connected to the gate line, a first electrode connected to one of the pair of drive electrodes or the pixel electrode, and a second electrode connected with the source line. The first electrode and the second electrode are formed so as to be separated from each other on the semiconductor layer. In this way, with use of a thin film transistor in which oxide semiconductor is used, the size of an arrangement area can be reduced. The area where the first to third switching elements are arranged is therefore made smaller, which makes it possible to prevent the aperture ratio from decreasing when more switching elements are provided.

The following describes embodiments of the present invention in detail, while referring to the drawings. In the drawings, identical or equivalent parts in the drawings are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

(Exemplary Configuration of Active Matrix Substrate)

FIG. 1 illustrates an exemplary configuration of a liquid crystal display device 10 according to Embodiment 1. FIG. 1 principally illustrates a configuration of an active matrix substrate 12A provided in the liquid crystal display device 10. The active matrix substrate 12A has a display region 18 where a plurality of pixels 16 are provided. In the display region 18, a plurality of pixel arrays 160-1, 160-2, 160-3, . . . are arrayed in one direction (the lateral direction on the drawing). Each pixel array is composed of a plurality of pixels 16 arrayed in a direction different from the above-described direction (the longitudinal direction on the drawing). In this way, the plurality of pixels 16 are arranged in matrix.

Each pixel 16 includes a pair of drive electrodes 32A, 32B and a pixel electrode 36. The pair of drive electrodes 32A, 32B and the pixel electrode 36 are connected to three source lines 30A-1, 30B-1, and 30C-1 via thin film transistors (hereinafter referred to as TFTs) 34A, 34B, and 34C, respectively. In other words, to one pixel 16, three source lines are connected.

More specifically, each pixel 16 includes a TFT 34A connected to one of the pair of drive electrodes 32A, 32B (here, the drive electrode 32A), a TFT 34B connected to the other drive electrode, that is, the drive electrode 32B, and a TFT 34C connected to a pixel electrode 36. In the present embodiment, the source line connected to the TFT 34A is referred to as a first source line 30A, the source line connected to the TFT 34B is referred to as a second source line 30B, and the source line connected to the TFT 34C is referred to as a third source line 30C. The first source line 30A is provided for each pixel array. The first source line 30A of each pixel array is connected to TFTs 34A of a plurality of pixels that are a group of pixels composing each pixel array. In other words, the drive electrodes 32A in the group of pixels in one pixel array are connected to one first source line 30A via the TFTs 34A. The second source line 30B and the third source line 30C are similarly provided for each pixel array, and are connected to the TFTs 34B and the TFTs 34C, respectively, of the pixels that are a group of pixels included each pixel array.

The TFTs 34A, 34B, and 34C are examples of the first switching element, the second switching element, and the third switching element, respectively. The TFTs 34A, 34B, and 34C of one pixel 16 are all connected to one and same gate line 28 among a plurality of gate lines 28-1, 28-2, and so on. The gate line 28 is a transmission line for supplying control signals to the TFTs 34A, 34B, and 34C. The gate lines 28 are formed so as to be extended in a direction crossing the source lines 30. The TFTs 34A, 34B, and 34C of a plurality of pixels arrayed in the direction in which a certain gate line 28 extends are all connected to the gate line 28 concerned. In other words, for each raw of the pixels, the gate line 28 is provided. The plurality of gate lines 28 and the plurality of source lines 30 are arranged in a lattice form.

Though not illustrated in FIG. 1, a counter substrate opposed to the active matrix substrate 12A is arranged so as to cover the active matrix substrate 12A. Between the active matrix substrate 12A and the counter substrate, a liquid crystal layer is sealed. In FIG. 1, the position at which a counter electrode 38 is provided on the counter substrate is indicated by a broken line. In the example illustrated in FIG. 1, the counter electrode 38 is arranged at such a position that the counter electrode 38 overlaps the pixel electrodes 36 and the pairs of drive electrodes 32A, 32B as viewed in a plan view. The counter electrode 38 is formed so as to cover a substantially entire area of the display region 18.

The gate lines 28-1, 28-2, . . . are connected to the gate driver 22. The source lines 30 are connected to the source driver 24. The gate driver 22 sequentially supplies voltages Vg-1, Vg-2, . . . to the gate lines 28-1, 28-2, . . . , respectively. By so doing, the rows of the pixels are sequentially selected, or in other words, scanned. The source driver 24 supplies voltages Vsa-1, Vsb-1, Vsc-1, Vsa-2, . . . corresponding to gray levels displayed by the pixels to the source lines 30A-1, 30B-1, 30C-1, 30A-2, . . . in synchronization with the timings at which the gate lines are selected by the gate driver 22, respectively.

In the example illustrated in FIG. 1, the voltages Vsa-1, Vsb-1, and Vsc-1 corresponding to the display gray level displayed by one pixel 16 are separately supplied, respectively, to the first source line 30A, the second source line 30B, and the third source line 30C connected to the foregoing pixel 16. This allows a voltage of a value corresponding to the gray level displayed by each pixel to be independently supplied to the pair of drive electrodes 32A, 32B and the pixel electrode 36. This makes it possible to finely control, with good balance, a horizontal electric field generated by the pair of drive electrodes 32A, 32B, and a vertical electric field generated by the pixel electrode 36 and the counter electrode 38. The operations and effects of this are described below.

The operations of the gate driver 22 and the source driver 24 can be controlled by a control circuit provided on a liquid crystal control substrate 20. The control circuit of the liquid crystal control substrate 20, for example, can input respective voltage values of the pair of drive electrodes 32A, 32B and the pixel electrode 36 in each pixel to the source driver 24. In the example illustrated in FIG. 1, voltage signal values (Pa, Pb, Pc) corresponding to voltages applied to the pair of drive electrodes 32A, 32B and the pixel electrode 36, respectively, are sequentially input from the liquid crystal control substrate 20 to the source driver 24. Further, a reference voltage value Vr as a reference value for a voltage to be output to a source line corresponding to each voltage signal value, and a value indicating a voltage Vt of the counter electrode 38, are input to the source driver 24. To the gate driver 22, a gate voltage Vg to be supplied to each gate line is input.

In the present embodiment, constituent elements that control operations for displaying an image on the display region of the liquid crystal display device 10, such as the gate driver 22, the source driver 24, and the control circuit of the liquid crystal control substrate 20, are collectively referred to as a "control unit 14". At least a part of the gate driver 22, the source driver 24, and the liquid crystal control substrate 20 can be formed with circuits or semiconductor chips mounted on the active matrix substrate 12A. Alternatively, at least a part of the control unit 14 can be formed with an FPC connected to the active matrix substrate 12A, or circuits or semiconductor chips mounted on a substrate that is connected therewith via an FPC.

(Exemplary Configuration of Pixel)

Figure 2:
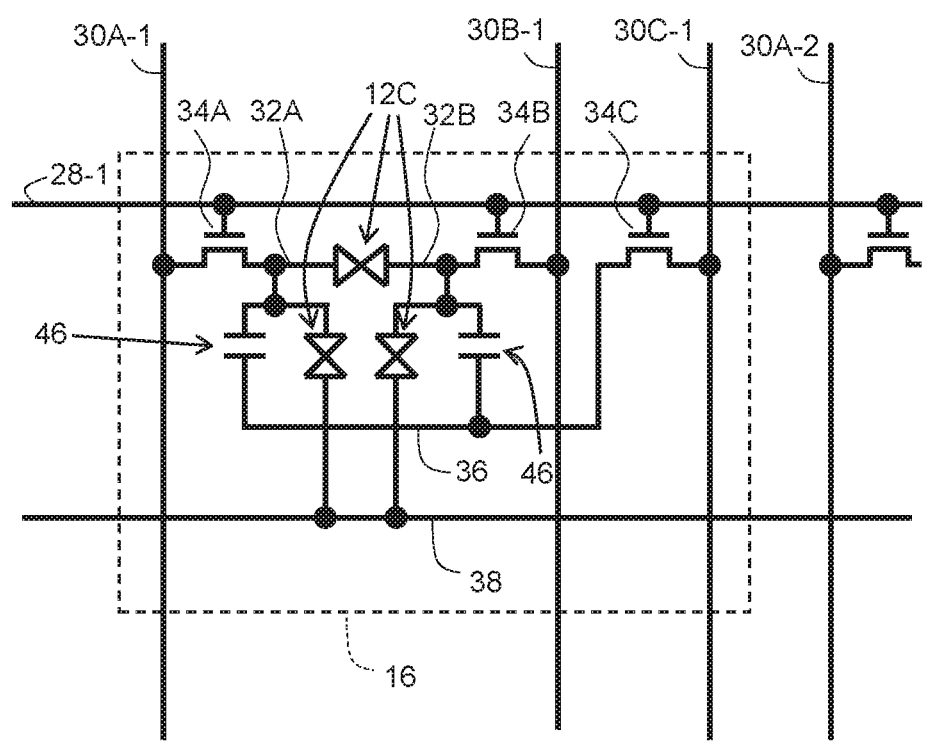
FIG. 2 is an equivalent circuit diagram of a pixel 16 illustrated in FIG. 1.
Figure 3:
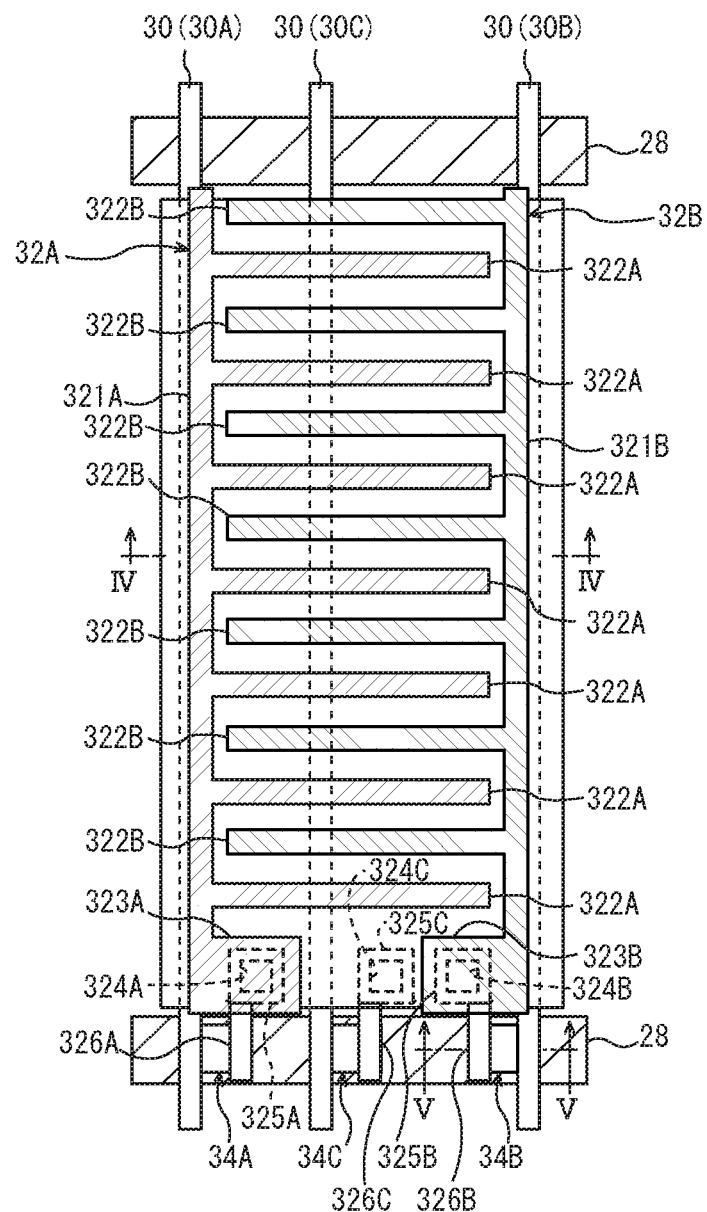
FIG. 3 is a plan view of the pixel 16 illustrated in FIG. 1.
Figure 4:
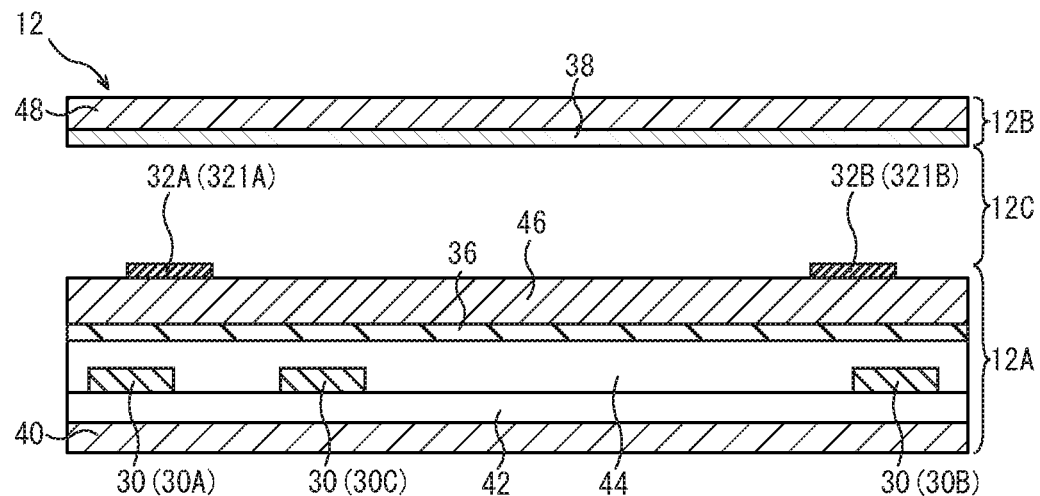
FIG. 4 is a cross-sectional view taken along a line IV-IV in FIG. 3.
Figure 5:
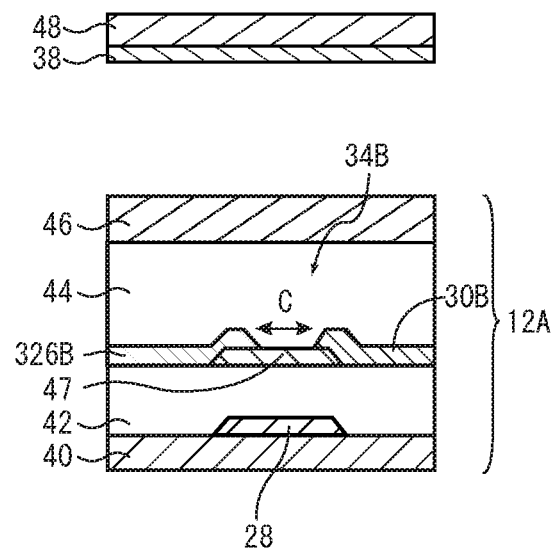
FIG. 5 is a cross-sectional view taken along a line V-V in FIG. 3.

FIG. 2 is an equivalent circuit of the pixel 16 illustrated in FIG. 1. FIG. 3 is a plan view of the pixel 16 illustrated in FIG. 1. FIG. 4 is a cross-sectional view taken along a line IV-IV in FIG. 3. FIG. 5 is a cross-sectional view taken along a line V-V in FIG. 3.

In an example illustrate in FIG. 2, the gate line 28-1 is connected with three TFTs 34A, 34B, and 34C. The sources of the two TFTs 34A and 34B among these three are connected to the first source line 30A-1, and the second source line 30B-1, respectively. The drain of the TFT 34A, i.e., one of these two, is connected to the drive electrode 32A, and the drain of the other one, i.e., the TFT 34B, is connected to the drive electrode 32B. The source of the TFT 34C, i.e., the remaining one among the three, is connected to the third source line 30C-1. This drain of the TFT 34C is connected to the pixel electrode 36.

The drive electrode 32A and the drive electrode 32B are arranged so as to be opposed to each other in a direction parallel to the surface of the active matrix substrate 12A (details are described below with reference to FIGS. 3 and 4). Further, the drive electrode 32A and the drive electrode 32B are arranged so as to be opposed to the counter substrate 12B in a direction perpendicular to the surface of the active matrix substrate 12A, with the liquid crystal layer 12C being interposed therebetween. In an equivalent circuit diagram illustrated in FIG. 2, therefore, the drive electrode 32A and the drive electrode 32B are connected with each other via a liquid crystal capacitor of the liquid crystal layer 12C. Further, the drive electrode 32A and the counter electrode 38 are also connected with each other via a liquid crystal capacitor of the liquid crystal layer 12C, and so are the drive electrode 32B and the counter electrode 38.

The pair of drive electrodes 32A, 32B are provided on an insulating layer, which is a dielectric. The pixel electrode 36 is provided on a side opposite to the drive electrodes 32A, 32B, so that the insulating layer is interposed therebetween (details are described below with reference to FIG. 4). In the equivalent circuit diagram illustrated in FIG. 2, therefore, the drive electrode 32A and the pixel electrode 36 are also connected with each other via a capacitor of an insulating layer 46, and so are the drive electrode 32B and pixel electrode 36.

In the configuration illustrated in FIG. 2, an electric field applied to the liquid crystal layer 12C between the pair of drive electrodes 32A, 32B, that is, the horizontal electric field, changes according to voltages of the drive electrode 32A and the drive electrode 32B. Further, an electric field applied to the liquid crystal layer 12C between the pair of drive electrodes 32A, 32B, the pixel electrode 36, and the counter electrode 38, that is, the vertical electric field, changes according to voltages of these three electrodes. Here, the voltage of the drive electrode 32A is controlled by the voltage of the first source line 30A-1 and the switching of the TFT 34A caused by the control signal of the gate line 28-1. The voltage of the drive electrode 32B is controlled by the voltage of the second source line 30B-1 and the switching of the TFT 34B caused by the control signal of the gate line 28-1. The voltage of the pixel electrode 36 is controlled by the voltage of the third source line 30C-1 and the switching of the TFT 34C caused by the control signal of the gate line 28-1. This makes it possible to finely control the vertical electric field and the horizontal electric field applied to the liquid crystal layer 12C by the voltages of the first to third source lines 30A-1, 30B-1, and 30C-1, as well as the switching of the TFT 34A, the TFT 34B, and the TFT 34C. Thereby, the balance of the vertical electric field and the horizontal electric field can be controlled.

A detailed configuration example of the pixel 16 is described with reference to FIGS. 3 and 4. As illustrated in FIG. 4, the liquid crystal display device 10 includes the active matrix substrate 12A, the counter substrate 12B, and the liquid crystal layer 12C.

The active matrix substrate 12A includes a base substrate 40, a plurality of the gate lines 28 (see FIG. 3), an insulating layer 42, a plurality of the source lines 30 (a plurality of groups of the source lines 30A, 30B, and 30C), an insulating layer 44, a pair of the drive electrodes 32A and 32B, the TFTs 34A, 34B, and 34C (see FIG. 3), the pixel electrode 36, and the insulating layer 46.

The plurality of gate lines 28 are formed, for example, on an upper side of a principal surface of the base substrate 40. The insulating layer 42 covers the plurality of gate lines 28. The plurality of source lines 30 are formed on a side opposite to the gate lines 28, with the insulating layer 42 being interposed therebetween. The insulating layer 44 covers the plurality of source lines 30. The pixel electrode 36 is formed so as to be in contact with the insulating layer 44. The pixel electrode 36 is provided for each pixel, and is arranged throughout an entirety of the region of each pixel. The insulating layer 46 covers the pixel electrode 36. The pair of drive electrodes 32A, 32B are formed on an upper side of the insulating layer 46. In this way, the pixel electrode 36 is formed on a side of the insulating layer 46, the side being opposite to the side of the insulating layer 46 where the drive electrodes 32A, 32B are formed. In other words, the pixel electrode 36 is arranged on a layer different from the layer of the drive electrodes 32A, 32B. Further, the pixel electrode 36 is arranged farther from the liquid crystal layer 12C, as compared with the drive electrodes 32A, 32B. This allows capacitors to be formed between the pixel electrode 36 and the drive electrode 32A, and between the pixel electrode 36 and the drive electrode 32B. The TFTs 34A, 34B, and 34C are arranged at positions overlapping the gate line 28, with the gate insulating film being interposed therebetween.

As illustrated in FIG. 3, the drive electrode 32A includes a first electrode portion 321A, and a plurality of second electrode portions 322A. The first electrode portion 321A extends in parallel with the first source line 30A, and overlaps the first source line 30A as viewed in a plan view. Each of the second electrode portions 322A is connected to the first electrode portion 321A. The plurality of second electrode portions 322A are arranged at a predetermined pitch in a direction in which the first electrode portion 321A extends.

To the other end of the first electrode portion 321A, a connection electrode portion 323A is formed. The connection electrode portion 323A includes a contact hole 324A. The connection electrode portion 323A is connected to a drain electrode portion 326A via a contact electrode portion 325A. The contact electrode portion 325A is formed at a position overlapping the contact hole 324A. The drain electrode portion 326A is connected to the drain of the TFT 34A.

The drive electrode 32B includes a first electrode portion 321B, and a plurality of second electrode portions 322B. The first electrode portion 321B extends in parallel with the second source line 30B, and overlaps the second source line 30B as viewed in a plan view. Each of the second electrode portions 322B is connected to the first electrode portion 321B. The plurality of second electrode portions 322B are arranged at a predetermined pitch in a direction in which the first electrode portion 321B extends. The second electrode portions 322B included in the drive electrode 32B and the second electrode portions 322A included in the drive electrode 32A are arrayed alternately in the direction in which the source line 30 extends.

At one end of the second electrode portion 322B, a connection electrode portion 323B is formed. The connection electrode portion 323B includes a contact hole 324B. The connection electrode portion 323B is connected to a drain electrode portion 326B via a contact electrode portion 325B. The contact electrode portion 325B is formed at a position overlapping the contact hole 324B. The drain electrode portion 326B is connected to the drain of the TFT 34B.

The pixel electrode 36 is arranged at a position overlapping the drive electrodes 32A, 32B, as viewed in a plan view. The pixel electrode 36 is arranged throughout an entirety of the region of each pixel, as viewed in a plan view. At an end of the electrode 36, which is a portion close to the gate line 28, a contact hole 324C is formed. The contact hole 324C passes through the insulating layer 44, and is connected to a contact electrode portion 325C, which is located below the insulating layer 44. With this configuration, the pixel electrode 36 is connected to the drain electrode portion 326C via the contact hole 324C and the contact electrode portion 325C. The contact electrode portion 325C is formed at a position overlapping the contact hole 324C. The drain electrode portion 326C is connected to the drain of the TFT 34C.

In the above-described example, the pair of drive electrodes 32A, 32B are a comb-type electrode each, and are provided in a layer on the pixel electrode 36. The drive electrode 32A, therefore, can be referred to as a first upper layer comb teeth electrode, and the drive electrode 32B can be referred to as a second upper layer comb teeth electrode, while the pixel electrode 36 can be referred to as a lower layer electrode. In the pixel structure in the present example, the pixel electrode 36 in a layer below the drive electrodes 32A, 32B is also provided with the TFT 34C. By so doing, the pixel structure is such that voltages that are different with the electrodes can be controlled as to each gray level of each pixel.

The counter substrate 12B is arranged so as to be opposed to the active matrix substrate 12A. The counter substrate 12B includes a base substrate 48, and the counter electrode 38. The counter electrode 38 is formed, for example, on an upper side of a principal surface of the base substrate 48.

The liquid crystal layer 12C is sealed between the active matrix substrate 12A and the counter substrate 12B. In the liquid crystal layer 12C, liquid crystal molecules have, for example, positive dielectric anisotropy, and are aligned perpendicularly.

(Exemplary Configuration of TFT)

FIG. 5 is a cross-sectional view illustrating a part where the TFT 34B illustrated in FIG. 3 is formed. In the example illustrated in FIG. 5, the gate line 28 is formed on the base substrate 40 of the active matrix substrate 12A. In this example, the gate line 28 and the gate of the TFT 34B are integrally formed. On the gate line 28, an insulating layer 42 is formed as a gate insulating film. At a position opposed to the gate line 28 via the insulating layer 42, a semiconductor layer 47 is formed. On the semiconductor layer 47, the source line 30B and a drain electrode portion 326B are formed separately. An area on the semiconductor layer 47, interposed between the source line 30B and the drain electrode portion 326B, is a channel area. In the present example, the source line 30B and the source of the TFT 34B are integrally formed. The drain electrode portion 326B is connected to the drive electrode 32B. On the insulating layer 42, an insulating layer 44 as a protection layer that covers semiconductor layer 47, the source line 30B and the drain electrode portion 326B are provided. The insulating layer 44 is formed with, for example, an insulating film of $SiO_2$ or the like. Above the insulating layer 44, there are provided the insulating layer 46, the liquid crystal layer 12C, the counter electrode 38, and the base substrate 48 in the stated order.

In the present embodiment, the semiconductor layer 47 contains an oxide semiconductor. As the oxide semiconductor, for example, InGaZnOx, which contains indium (In), gallium (Ga), zinc (Zn), and oxygen (O) as principal components, can be used. This InGaZnOx, that is, an In—Ga—Zn—O-based semiconductor is a ternary oxide of In, Ga, and Zn, and the ratio (composition ratio) of In, Ga, and Zn is not limited particularly. For example, the ratio may be In:Ga:Zn=2:2:1, In:Ga:Zn=1:1:1, In:Ga:Zn=1:1:2, or the like. In the semiconductor layer 47 of the present embodiment, an In—Ga—Zn—O-based semiconductor is used, which contains In, Ga, and Zn at a ratio of 1:1:2, for example. The TFT 18 having the semiconductor layer 47 containing an In—Ga—Zn—O-based semiconductor has a mobility equal to or more than about 20 times a mobility of a TFT in which a-Si is used, and a leakage current less than about one hundredth a leakage current of the same. Such an oxide semiconductor, therefore, is preferably used in a TFT for driving a pixel. By using TFTs that include the semiconductor layers 47 containing the In—Ga—Zn—O-based semiconductor, as the three TFTs 34A, 34B, and 34C provided in each pixel, electric power consumption of the liquid crystal display device 10 can be reduced significantly. Further, the size of the TFT can be reduced, which prevents the aperture ratio from decreasing when the number of the TFTs in a pixel increases.

The In—Ga—Zn—O-based semiconductor may be amorphous, or may include a crystalline substance part, thereby having crystallinity. As a crystalline In—Ga—Zn—O-based semiconductor, a crystalline In—Ga—Zn—O-based semiconductor having the c-axis aligned approximately perpendicularly with respect to the layer surface is preferable. The crystal structure of such an In—Ga—Zn—O-based semiconductor is disclosed in, for example, JP-A-2012-134475. The entirety of the disclosure of JP-A-2012-134475 is incorporated in the present description for reference.

Further, the semiconductor layer 47 may contain another oxide semiconductor in place of the In—Ga—Zn—O-based semiconductor. More specifically, the semiconductor layer 47 may contain, for example, a Zn—O-based semiconductor (ZnO), an In—Zn—O-based semiconductor (IZO (registered trademark)), a Zn—Ti (titanium)-O-based semiconductor (ZTO), a Cd (cadmium)-Ge (germanium)-O-based semiconductor, a Cd—Pb (lead)-O-based semiconductor, a CdO (cadmium oxide)-Mg (magnesium)-Zn—O-based semiconductor, an In—Sn (tin)-Zn—O-based semiconductor (for example, $In_2O_3$—$SnO_2$—ZnO), or an In—Ga (gallium)-Sn—O-based semiconductor.

(Exemplary Configuration of Liquid Crystal Control Substrate)

Figure 6:
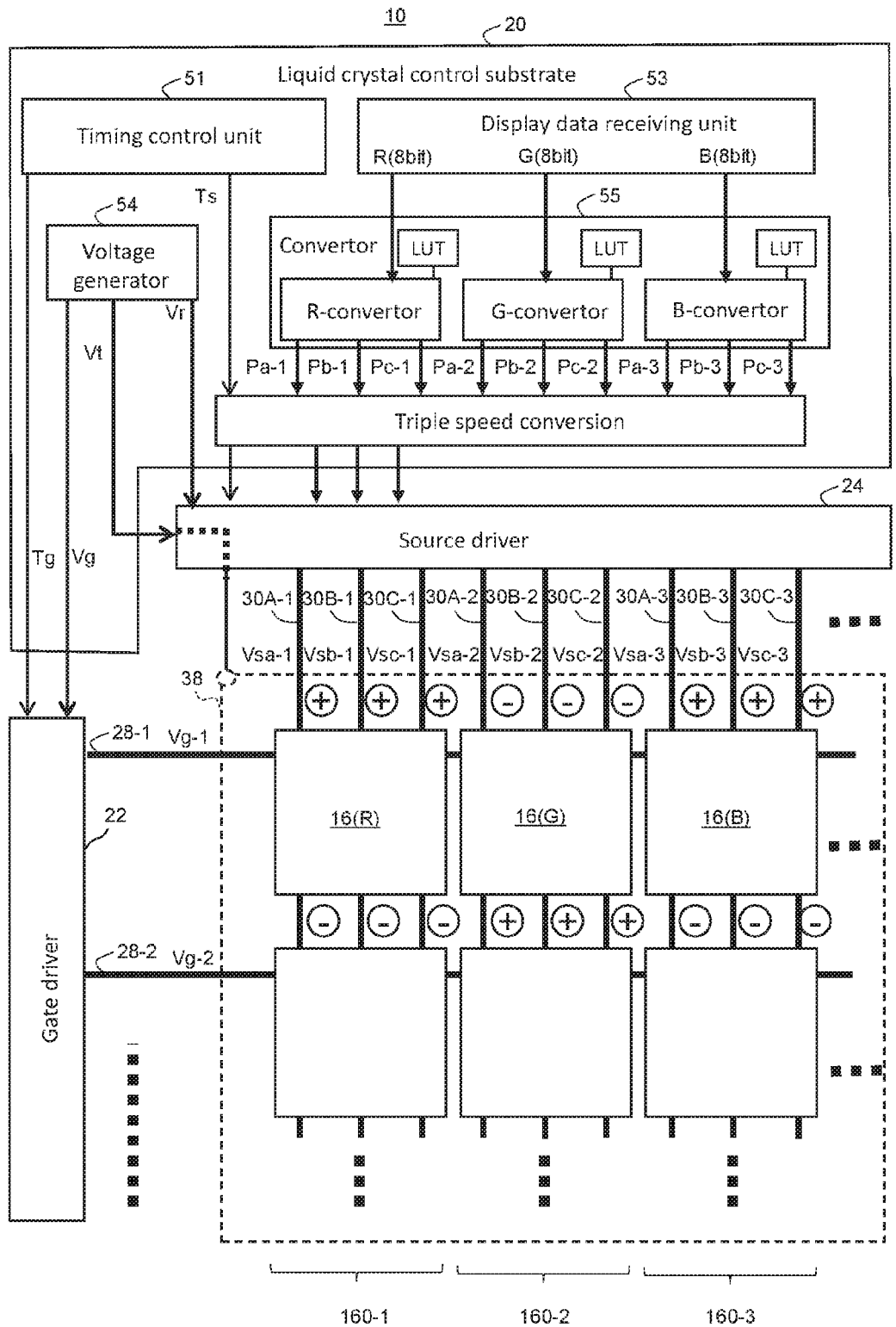
FIG. 6 is a functional block diagram illustrating an exemplary configuration of a liquid crystal control substrate 20.

FIG. 6 is a functional block diagram illustrating an exemplary configuration of the liquid crystal control substrate 20. In an example illustrated in FIG. 6, the liquid crystal control substrate 20 includes a timing control unit 51, a display data receiving unit 53, a voltage generator 54, and a convertor 55.

The timing control unit 51 generates signals indicating operation timings of the gate driver 22 and the source driver 24, based on data input from outside, indicating the display timings. The timing control unit 51 outputs, for example, a signal indicating a timing for applying a voltage to a pixel, to the gate driver 22 and the source driver 24.

The display data receiving unit 53 receives input of display data from outside. The display data may be, for example, a display gray level value indicating a gray level to be displayed at each pixel. In one example, the display data receiving unit 53 may receive data that represent a display gray level value of each pixel by 8 bits, and output the same to the convertor 55. The convertor 55 generates respective voltage values of the pair of drive electrodes 32A, 32B and the pixel electrode 36 in each pixel, based on the display gray level value of each pixel.

In an example illustrated in FIG. 6, in the display region 18, a pixel that emits light of R (red) color, a pixel that emits light of G (green) color, and a pixel that emits light of B (blue) color are arrayed side by side. The display data receiving unit 53 inputs display data that represent respective gray levels for the colors of R, G, and B by 8 bits each. The convertor 55 includes an R-convertor, a G-convertor, and a B-convertor, which convert respective display gray level values to voltage signal values for the pair of drive electrodes 32A, 32B and the pixel electrode 36, regarding the colors of R, G, and B.

Convertors of the respective colors of R, G, and B in the convertor 55 can acquire respective voltage signal values of the pair of drive electrodes 32A, 32B and the pixel electrode 36 corresponding to the display gray level values, by referring to a lookup table (LUT). The LUT is an example of a conversion value recording section that records respective voltage signal values of the pair of drive electrodes 32A, 32B corresponding to the display gray level values, and a voltage signal value of the pixel electrode 36 corresponding to the display gray level values. In the present example, the convertor 55 has such a configuration that a display gray level value is converted into a voltage signal value of each electrode, but the convertor 55 may have such a configuration that a display gray level value is converted into a voltage of each electrode.

In this way, the respective voltage signal values of the drive electrodes 32A, 32B, and the voltage signal value of the pixel electrode 36, which are obtained through the conversion by the convertor 55, are output to the source driver 24 at timings according to a triple-rate clock. This allows three voltage signal values for one pixel to be output to the source driver 24. In an example illustrated in FIG. 6, there are provided three lines for conveying signals indicating voltage signal values from the liquid crystal control substrate 20 to the source driver 24. In this case, data for the pixel of R, data for the pixel of G, and data for the pixel of B are output sequentially to the source driver 24 at one-third cycles. For example, first, regarding the pixel 16(R) for the color of red (R), a voltage signal value Pa-1 of the drive electrode 32A, the voltage signal value Pb-1 of the drive electrode 32B, and the voltage signal value Pc-1 of the pixel electrode 36 are output to the source driver 24. Thereafter, regarding the pixel 16(G) for the color of green (G), data of the voltage signal values Pa-2, Pb-2, and Pc-2 are output to the source driver 24. Further thereafter, regarding the pixel 16(B) for the color of blue (B), data of the voltage signal values Pa-3, Pb-3, and Pc-3 are output to the source driver 24. In this way, by transferring the voltage signal value data to the source driver 24 through the three signal lines according to a triple-rate clock, data of three voltage signal values per one pixel can be transferred, with the same wiring configuration as the conventional wiring configuration used for transferring gray level value data for three pixels of R, G, and B.

The source driver 24 outputs voltage values for the pixel 16(R) based on the three voltage signal values Pa-1, Pb-1, and Pc-1, to the source lines 30A-1, 30B-1, and 30C-1 connected to the pixel 16(R), respectively. Similarly, the source driver 24 outputs voltages for the pixel 16(G) based on the three voltage signal values Pa-2, Pb-2, and Pc-2 to the source lines 30A-2, 30B-2, and 30C-2 connected to the pixel 16(G), respectively, and outputs voltages for the pixel 16(B) based on the three voltage signal values Pa-3, Pb-3, and Pc-3 to the source lines 30A-3, 30B-3, and 30C-3 connected to the pixel 16(B), respectively.

The voltage generator 54 generates a voltage Vr, which serves as a reference for generation of a voltage Vg that the gate driver 22 applies to the gate line 28 and a voltage that the source driver 24 applies to the source line 30, as well as a voltage Vt to be applied to the counter electrode 38, and outputs the same to the gate driver 22 and the source driver 24. The voltage Vr applied to the source line 30 can be used as a reference voltage value. The reference voltage value is a voltage that is a part of the voltage values applied to the pixel, and serves as a reference. The source driver 24 can generates a voltage for each pixel corresponding to the gray level to be displayed, by using the reference voltage and a voltage signal value that is input.

With the control circuit of the liquid crystal control substrate 20 illustrated in FIG. 6, for example, the counter electrode voltage can be set uniform, and the voltages applied to the source lines can be set so as to conform with the dot inversion driving (a driving method wherein the polarity is reversed pixel by pixel in a staggered form). In this case, the following operation is enabled. First, an input display data signal and display timing data are input to the liquid crystal control substrate 20. The display data receiving unit 53 inputs data indicating the display gray level values of the respective colors (R, G, B) of display data, to the R-convertor, the G-convertor, and the B-convertor of the convertor 55, respectively. The convertor 55 converts the input display gray level value into data indicating the voltage signal values corresponding to the pixel electrodes, respectively (data for the drive electrode 32A, data for the drive electrode 32B, and data for the pixel electrode 36), and transfers the data to the source driver 24.

At a timing when data for pixels of one line of the gate lines 28 are retained by the source driver 24, data retained by the source driver 24 for the respective pixels are converted into voltages corresponding to the voltage signal values, respectively, based on the reference voltage generated by the voltage generator, and are output to the source lines 30. Here, data of three voltage signal values per one pixel (data for the drive electrode 32A, data for the drive electrode 32B, and data for the pixel electrode 36) are converted to voltages, and are output to three source lines, respectively.

At the same time when voltages for the pixels of one line are output to the source lines 30, the gate line 28 of the pixels to which the data are to be written is turned ON (voltage, high). The gate line 28 and the source lines 30 are connected via the TFTs 34A, 34B, and 34C. When the gate line 28 is in an ON state, the voltage values of the source lines 30 are applied to the electrodes, respectively. Thereafter, when the gate line is turned OFF (voltage, low), charges corresponding to the voltages applied to the electrodes, respectively, are retained.

In the dot inversion driving, the polarities of the voltage signals output from source driver 24 can be controlled so that the positive polarity and the negative polarity alternate by every three source lines. Further, it is possible to control the same so that the polarity changes by every pixel line. In other words, the control may be as follows: during one frame period, in a pixel array along the source line, voltage signals having different polarities are supplied to two adjacent pixels. This makes it possible to change the polarity of the voltage signal by every line, in the vertical direction of the display region 18 as well. Further, the driving also can be performed in such a manner that the polarity of each pixel is reversed by every frame.

(Technical Significance in Changing Voltage Value of Pixel Electrode by Every Gray Level)

The above-described configuration of the liquid crystal display device makes it possible that, in addition to the voltage values of the pair of drive electrodes 32A, 32B, the voltage value of the pixel electrode 36 in the lower layer also can be changed according to the gray level. Here, the technical significance in changing the voltage value of pixel electrode 36 in the lower layer for each gray level is described.

In Non-patent Document 1 mentioned above, a mode of performing gradation display by controlling directions of the liquid crystal molecules by using the vertical electric field and the horizontal electric field with four electrodes is described. In the case of this mode, liquid crystal molecules having positive dielectric anisotropy are used. In white display, therefore, a horizontal electric field is applied using a potential difference between the pair of drive electrodes 32A, 32B, so that the long axis direction of the liquid crystal molecules is directed in a direction parallel to the glass substrate (see FIG. 7). In black display, a vertical electric field is applied between the counter electrode 38 and the pixel electrode 36 (lower layer electrode), so that the long axis direction of the liquid crystal molecules is directed in a direction perpendicular to the base substrate 40 (see FIG. 8). In a case where a common electrode (common for the pixels in the panel) is used as the lower layer electrode, as is disclosed in Non-patent Document 1, however, the vertical electric field identical to that in black display is applied in white display as well. In this case, it is difficult to tilt the liquid crystal molecules sufficiently in the direction parallel to the base substrate 40.

In the configuration of the present embodiment, for example, the transmittance of the panel pixel is controlled by controlling the angle through which the long axis direction of the liquid crystal molecules is tilted from the direction perpendicular to the glass substrate. Thereby, the gradation display can be performed. In this case, in order to perform appropriate gradation display, it is preferable that the alignment direction (the orientation of the long axis direction) of the liquid crystal molecules is appropriately controlled. In a case where the vertical electric fields are uniform as is the case with the configuration of Non-patent Document 1, to control the same is difficult. In some cases, very fine voltage setting is needed among gray levels, which makes it impossible to perform appropriate gradation display. This can be avoided by making the vertical electric fields weaker, depending on the tilts of the liquid crystal molecules, with use of the above-described configuration of the liquid crystal display device 10. More specifically, the configuration is such that a common lower layer electrode is not provided, but lower layer electrodes are provided for pixels, respectively, and the voltages of the lower layer electrodes are controlled according to display gray levels, respectively. With this configuration, the balance between the vertical electric field and the horizontal electric field can be adjusted. This makes it possible to control the alignment direction of the liquid crystal molecules, thereby performing appropriate gradation display. Besides, since this allows the control of the alignment direction of the liquid crystal molecules to be performed with the combination of the horizontal electric field and the vertical electric field, the response speed of the liquid crystal molecules is improved.

(Voltage Value Setting Example 1)

The following describes an example of setting of voltage values of the pair of drive electrodes 32A, 32B and the pixel electrode 36, depending on the gray level. As the present example, a voltage setting example in a case where the voltage of the counter electrode 38 is set uniform and the drive electrodes 32A, 32B and the pixel electrode 36 of each pixel are subjected to dot inversion driving is described.

First of all, voltage values of the drive electrodes 32A, 32B and the pixel electrode 36 in a case where the pixel is in black display are described. In the case of black display, since it is preferable that vertical electric field is applied, the setting is made so that a voltage is applied across the counter electrode 38, and the drive electrode 32A, the drive electrode 32B, and the pixel electrode 36. Let the voltage of the vertical electric field applied to the liquid crystal layer 12C be "Vp" (alternate), and let the voltage of the counter electrode 38 be "Vc". Then, the voltages of the respective electrodes are as follows. Regarding the drive electrodes 32A, 32B and the pixel electrode 36, voltage value setting examples are indicated regarding both of the cases where the voltage has a positive polarity and the case where the voltage has a negative polarity. The driving can be performed by reversing the polarity of each electrode between the positive polarity and the negative polarity frame by frame.

Counter electrode: Vc (uniform);
Drive electrode 32A: Vc+Vp (positive), Vc−Vp (negative);
Drive electrode 32B: Vc+Vp (positive), Vc−Vp (negative);
Pixel electrode 36: Vc+Vp+Vm (positive), Vc−Vp−Vm (negative).

Here, the "Vm" has a value with the dielectric constant and the thickness of the liquid crystal layer, and the dielectric constant and the thickness of the insulating layer 46 being taken into consideration. In this case, the dielectric constant of the liquid crystal layer is set to a dielectric constant in a case where the liquid crystal molecules are aligned so that the long axis direction thereof is perpendicular to the glass substrate, and is given as "∈_lc//". The thickness of the liquid crystal layer is given as "dl", and the dielectric constant and the thickness of the insulating layer 46 are given as "∈_m", and "dm", respectively. Then, the above-described "Vm" can be represented by the following expression.

$$Vm=(dm/dl)\times(\in\_lc///\in\_m)\times Vp$$

As one example, voltages can be set specifically as follows.

Counter electrode 38: 7.5 V (uniform);
Drive electrode 32A: 14.5 V (positive), 0.5 V (negative);
Drive electrode 32B: 14.5 V (positive), 0.5 V (negative);
Pixel electrode 36: 15.0 V (positive), 0.0 V (negative).

Further, all of the electrodes other than the counter electrode 38 can be driven with the same polarity. Further, the insulating layer 46 is made of such a material having a dielectric constant and has such a thickness that the above-described conditions are satisfied.

Next, voltage values of the drive electrodes 32A, 32B and the pixel electrode 36 in a case of white display are described. In a case of white display, it is preferable to apply as large a horizontal electric field as possible. For this purpose, the voltages of the drive electrodes 32A, 32B and the pixel electrode 36 are set so that a voltage for the horizontal electric field is applied across the pair of drive electrodes 32A, 32B, and further, a vertical electric field that would not disturb the line of electric force of the horizontal electric field (ideally, no disturbance) is applied. The voltage of the horizontal electric field applied to the liquid crystal layer 12C is given as "Vh" (alternate), and then, the voltages of the electrodes are as follows.

Counter electrode 38: Vc (uniform);
Drive electrode 32A: Vc (positive), Vc (negative) (for both of the polarities, the potential is identical to that of the counter electrode);
Drive electrode 32B: Vc+Vh (positive), Vc−Vh (negative) (the polarity is reversed between the positive polarity and the negative polarity frame by frame);
Pixel electrode 36: Vc+Vn (positive), Vc−Vn (negative) (the polarity is reversed between the positive polarity and the negative polarity frame by frame).

Here, "Vn" is set in such a manner that the potential difference between the drive electrode 32A and the pixel electrode 36, and the potential difference between the drive electrode 32B and the pixel electrode 36 are opposite regarding the polarity and have the same magnitude, in order to achieve good balance in the horizontal electric field applied across the drive electrodes 32A, 32B of the liquid crystal layer 12C. "Vn" can be set, for example, as follows.

$$Vc-(Vc+Vn)=-((Vc+Vh)-(Vc+Vn))$$

$$\therefore Vn=Vh/2$$

As one example, voltages can be set specifically as follows.

Counter electrode 38: 7.5 V (uniform);
Drive electrode 32A: 7.5 V (positive), 7.5V (negative) (the polarity is reversed between the positive polarity and the negative polarity frame by frame);
Drive electrode 32B: 15.0 V (positive), 0.0 V (negative) (the polarity is reversed between the positive polarity and the negative polarity frame by frame);
Pixel electrode 36: 11.25V (positive), 3.75V (negative) (the polarity is reversed between the positive polarity and the negative polarity frame by frame).

Figure 7:
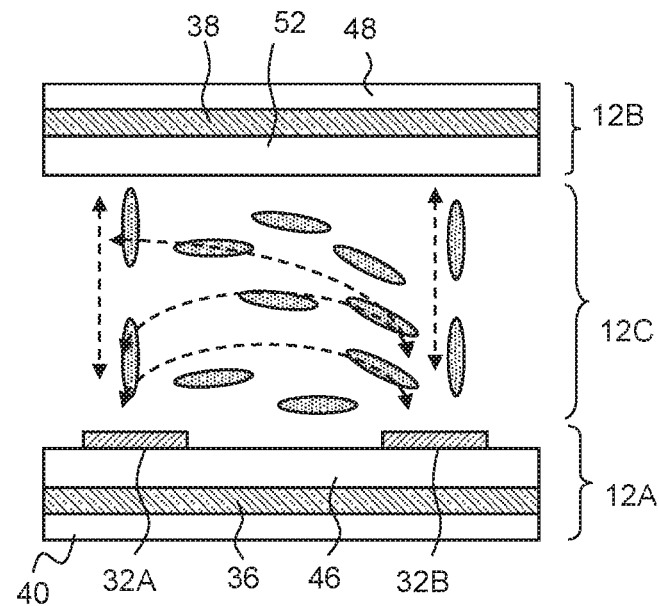
FIG. 7 illustrates an example of a horizontal electric field.
Figure 8:
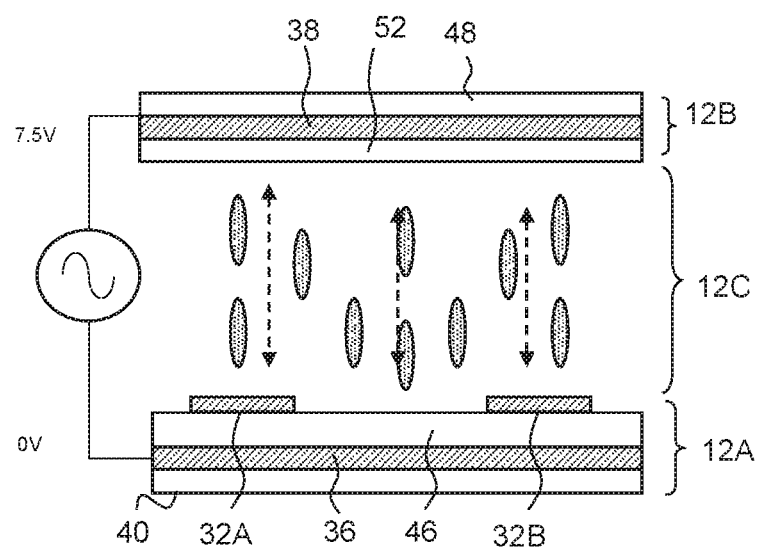
FIG. 8 illustrates an example of a vertical electric field.
Figure 9:
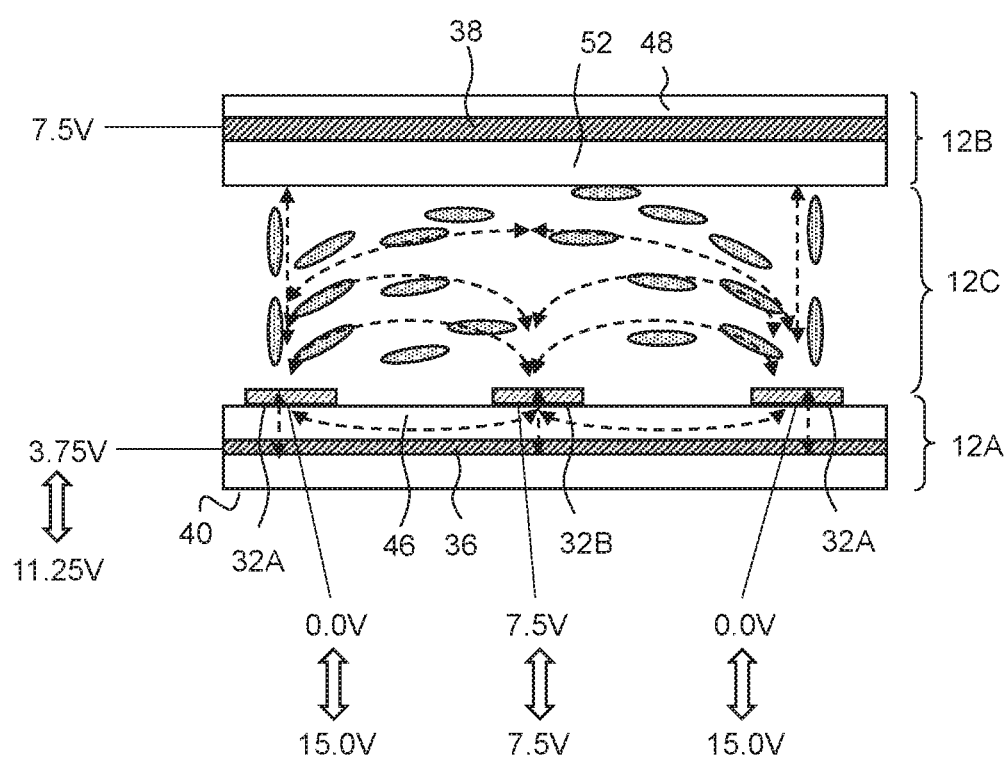
FIG. 9 illustrates an exemplary alignment state of liquid crystal molecules when voltages in white display are applied.

FIG. 9 illustrates an exemplary state of alignment of liquid crystal molecules in a case where the above-described voltages in white display are applied to the counter electrode 38, the drive electrodes 32A, 32B, and the pixel electrode 36. In an example illustrated in FIG. 9, the lines of electric force directed in a direction parallel to the display surface of the liquid crystal layer 12C are distributed with good balance, by the horizontal electric field between the drive electrode 32A and the drive electrode 32B, and the vertical electric field between the counter electrode 38, and the drive electrodes 32A, 32B and the pixel electrode 36. Besides, in an example illustrated in FIG. 9, at the voltage application in white display, the drive electrode 32B and the counter electrode 38 have the same potential. Therefore, there is substantially no vertical electric field above the drive electrode 32B. In view of this, as compared with a case of, for example, a voltage setting with which a vertical electric field occurs as illustrated in FIG. 7, the long axis direction of liquid crystal molecules at the voltage application in white display tends to be directed in the horizontal direction, whereby the transmittance is increased.

Incidentally, in the configuration illustrated in FIG. 9, the counter substrate 12B includes a dielectric layer 52. The dielectric layer 52 is arranged on the liquid crystal layer 12C side with respect to the counter electrode 38. The dielectric layer 52 is made of, for example, an organic film, an ultraviolet curing resin, or a thermosetting resin. In such a configuration, when the horizontal electric field occurs, liquid crystal molecules in the vicinities of the counter electrode 38 tend to tilt easily. The transmittance therefore increases.

Figure 10:
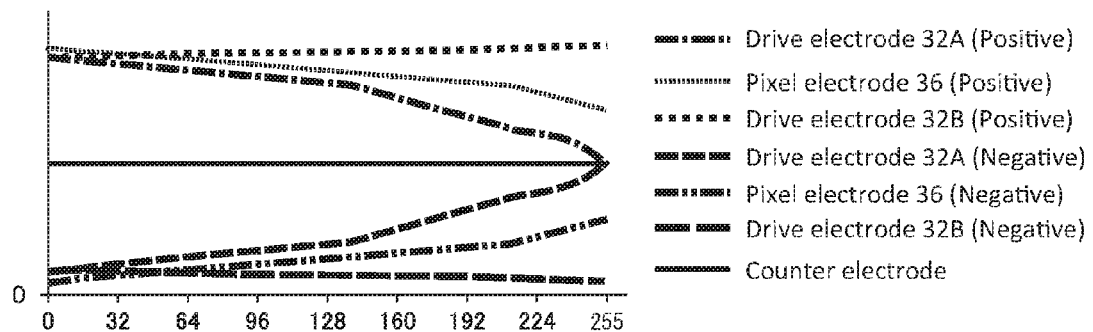
FIG. 10 is a graph illustrating exemplary voltage values set for the display gray levels, respectively.

In a case where the voltages in black display and the voltages in white display are set as described above, intermediate tones between white and black can be achieved by setting voltages of the respective electrodes according to γ to match. In intermediate display between white and black, generally, the voltages of the drive electrodes 32A, 32B and the pixel electrode 36, for both of the positive and negative polarities, are set to voltages between the voltage for white and the voltage for black. FIG. 10 is a graph illustrating exemplary voltage values set for the display gray levels, respectively, in this manner.

In FIG. 10, the horizontal axis indicates the display gray level, and the longitudinal axis indicates voltage of each electrode (the drive electrodes 32A, 32B and the pixel electrode 36). The display gray level of "0" indicates black display, and the display gray level of "255" indicates white display. In an example illustrated in FIG. 10, voltage of the electrodes are set so that, as the display gray level is farther from that of black display and is closer to that of white display, the potential difference between the drive electrode 32A and the drive electrode 32B increases. Further, the voltages of the electrodes are also set so that the potential difference between the pixel electrode 36 and the drive electrode 32A, as well as the potential difference between the pixel electrode 36 and the drive electrode 32B, increase as the display gray level is farther from that of black display and is closer to that of white display. Still further, at a display gray level close to white display, that is, in a range of 160 or more, voltages of the respective electrodes are set so that the potential difference between the pixel electrode 36 and the drive electrode 32A, and the potential difference between the pixel electrode 36 and the drive electrode 32B, are approximately equal to each other.

(Voltage Value Setting Example 2)

In the voltage setting for the drive electrodes 32A, 32B and the pixel electrode 36, voltages can be set with a gate lead-in voltage being taken into consideration. At each pixel, the voltage of the gate of the TFT 34 is changed according to the control signal of the gate line 28, whereby the state of the TFT 34 is switched between the ON state and the OFF state. Here, in some cases, a voltage of an electrode connected to the drain of the TFT 34 is influenced by a drop of the voltage of the gate, and thereby changes. This change constitutes the lead-in voltage of the gate. The source driver 24 is capable of outputting a voltage signal that is corrected for a portion equivalent to this lead-in voltage, to the source line 30. In other words, the voltage applied as a source line voltage can be set, with a component that cancels the lead-in voltage of the gate being included therein.

The lead-in voltage ΔVgd can be expressed by, for example, the formula below.

$$\Delta Vgd=Cgd/\Sigma(Clc+Cs+Co+Cgd)\times(Vgh-Vgl)$$

Here, "Clc" represents a capacitance between the counter electrode 38 and the pixel electrode 36 or the drive electrodes 32A, 32B in the liquid crystal alignment of the display gray level; "Cs" represents a capacitance between the source line and the pixel electrode 36 or the drive electrodes 32A, 32B; "Cgd" represents a capacitance between the gate line and the pixel electrode 36 or the drive electrodes 32A, 32B (including a gate-drain capacitance of the TFT); "Co" represents a capacitance coupled with the other electrodes; and "Vgh" and "Vgl" represent a gate ON voltage and a gate OFF voltage, respectively. In the present embodiment, three electrodes, i.e., the pixel electrode 36 and the pair of drive electrodes 32A, 32B, are connected to the TFTs 34A, 34B, and 34C, respectively. Therefore, between the drive electrodes 32A, 32B and the pixel electrode 36, values of parameters that determine the value of "ΔVgd" are different. In other words, the lead-in voltage value of the drive electrodes 32A, 32B and that of the pixel electrode 36 are not identical to each other. It is therefore preferable that respective lead-in voltages at respective gray levels should be estimated individually for the drive electrodes 32A, 32B and the pixel electrode 36.

Figure 11:
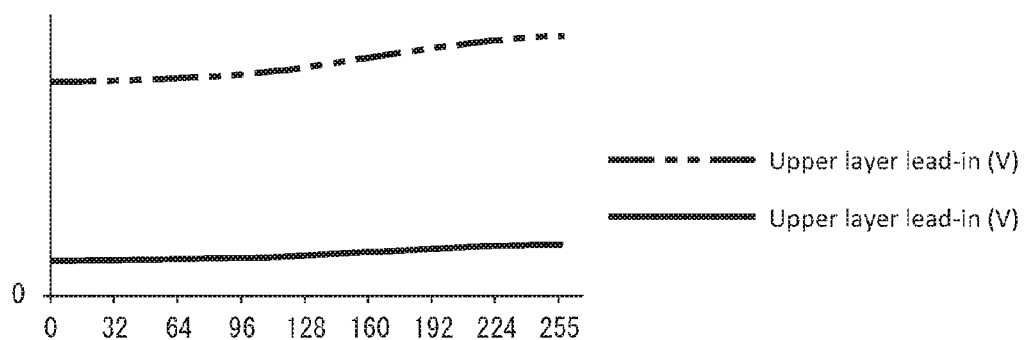
FIG. 11 illustrates exemplary lead-in voltage values in the liquid crystal display device.
Figure 12:
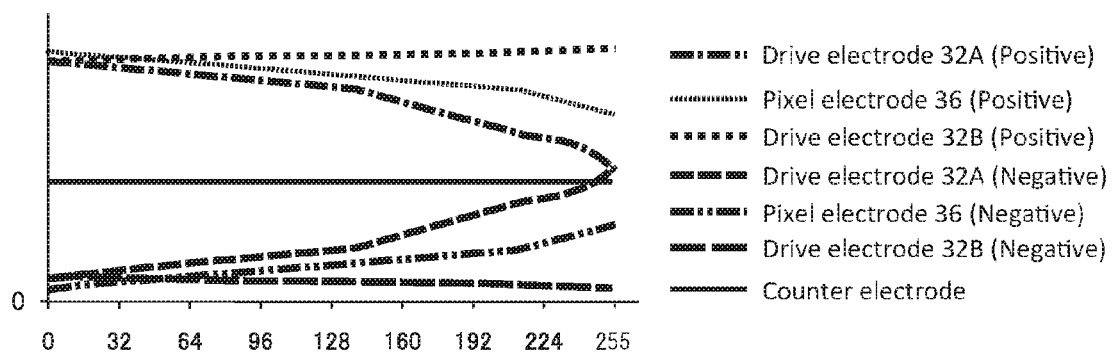
FIG. 12 is a graph illustrating exemplary voltage values that are set with lead-in voltages being taken into consideration.

The graph in FIG. 11 illustrates exemplary lead-in voltage values in the liquid crystal display device of the present embodiment. FIG. 11 illustrates gray-level-dependent changes in lead-in voltages (upper layer lead-in voltages) for the TFTs 34A, 34B connected to the drive electrodes 32A, 32B arranged in an upper layer, and lead-in voltages (lower layer lead-in voltages) for the TFT 34C connected to the pixel electrode 36 arranged in a lower layer. The lead-in voltage values are values with respect to the counter electrode. In a case where a voltage is to be applied to the source line 30, the voltage to be applied is preferably a voltage having a value obtained by adding a value for this lead-in voltage component to the voltage of the counter electrode 38. FIG. 12 is a graph illustrating exemplary setting of a voltage to be applied to the source line of the pixel electrode 36 or the drive electrodes 32A, 32B, with the lead-in voltage being taken into consideration.

Another method may be suggested in which the adjustment of the lead-in voltage is performed by adjusting the reference voltage of the source driver 24. In the present embodiment, however, three source lines are connected to one pixel, and TFTs having different lead-in voltages are connected to the three source lines, respectively. For example, in some cases, the TFTs 34A, 34B of the drive electrodes 32A, 32B and the TFT 36 of the pixel electrode 36 have different properties or different electrode capacitances. In this case, at each gray level, values of the lead-in voltages of the drive electrodes 32A, 32B and that of the pixel electrode 36 are different. In such an case, the adjustment using the reference voltage allows only a voltage value common to these three source lines to be corrected, and does not allow voltages corresponding to the TFTs having different lead-in voltages to be corrected, in some cases. To cope with this, as illustrated in FIG. 12, voltage values for respective gray levels can be set, with the lead-in voltages being taken into consideration, for the drive electrodes 32A, 32B, and the pixel electrode 36. With this configuration, the convertor 55 can generate voltage signal values for obtaining voltage values set with the lead-in voltages being taken into consideration as described above, based on the values of the display gray levels.

(Exemplary Configuration for Generating Voltage Value According to Display Gray Level)

FIG. 13 is a table illustrating exemplary voltage values of the respective electrodes with respect to display gray level values that are set, for example, as illustrated in FIG. 10 or 12. The ladder of the source driver 24 can be designed and the reference voltage value can be determined so that these voltage values can be output. The output voltage values with respect to the source driver input data values (8 bits) are, for example, those as illustrated in the table in FIG. 14. In this example, when an input data value indicated in the left column in the table is input to the source driver 24, the source driver 24 outputs, to the source line, a signal of a voltage in the center column corresponding to the input data value in the case where the polarity thereof is positive, or a signal of a voltage in the right column corresponding to the input data value in the case where the polarity thereof is negative.

Input data values to be input to the source driver, corresponding to the voltages of the drive electrodes 32A, 32B, and the pixel electrode 36, regarding the display gray level values (display data) to be input to the liquid crystal control substrate 20, can be recorded in the form of a table (LUT) in advance. The convertor 55, referring to this table, can convert display gray level values into respective input data values (exemplary voltage signal values) of the drive electrodes 32A, 32B and the pixel electrode 36. FIG. 15 illustrates exemplary contents of such a table.

Figure 16:
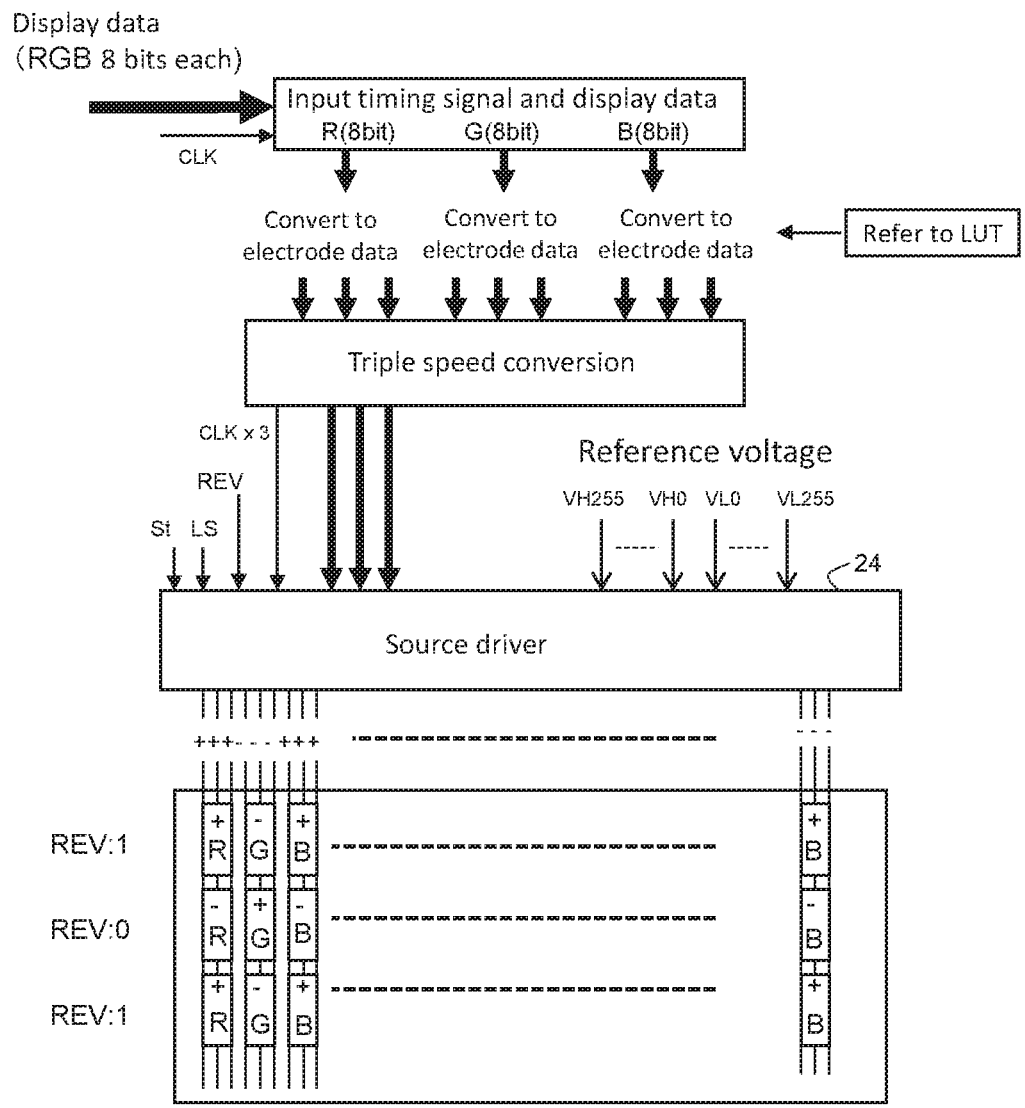
FIG. 16 is a diagram for explaining exemplary operations of supplying voltage signals corresponding to display gray level values, to three electrodes, respectively.

FIG. 16 is a diagram for explaining exemplary operations of converting display gray level values into voltage signal values of the drive electrodes 32A, 32B and the pixel electrode 36, and supplying voltages corresponding to the converted voltage signal values, to these electrodes, respectively. In the example illustrated in FIG. 16, the liquid crystal display device 10 receives display data and a clock signal CLK from a host system. As display data, for example, 8-bit data representing each display gray level of R, G, and B are input. In this case, respective display gray level values of R, G, and B are converted by the convertor 55 (see FIG. 6) into three data values (voltage signal value data) corresponding to the drive electrodes 32A, 32B and the pixel electrode 36, respectively. Here, the convertor 55 can refer to, for example, the table (LUT) as illustrated in FIG. 15.

In other words, input RGB (8 bits each) display data are converted into voltage signal value data (8 bits each) corresponding to display gray levels of the three electrodes (the drive electrode 32A, the drive electrode 32B, and the pixel electrode 36), respectively. The converted voltage signal value data are input to the source driver 24 in the order of R, G, and B, by a clock tripled by a triple speed conversion circuit. The order of R, G, and B can be in accordance with the order in which the pixels are provided in the panel.

To the source driver 24, basically, the following are input, in addition to the power source: a start pulse St; a latch LS; a REV signal; a CLK (clock signal); converted voltage signal value data of the respective electrodes; and the reference voltage values. The REV signal is a signal for controlling the polarity of the voltage that is output to the source line, that is, the positive polarity (+) or the negative polarity (−).

The reference voltage can be set to a voltage corresponding to a part of voltage signal values, among the voltages applied to the pixel electrodes. For example, in a case of an 8-bit-output source driver, voltages corresponding to data of 0 to 255 are output with each of the polarities, and voltages each of which corresponds to one voltage signal value per 16 outputs, such as 0, 16, 32, . . . , 255, may be used as reference voltages. Further, two reference voltages, i.e., one voltage in the case of a positive polarity, and the other voltage in the case of a negative polarity, are set for one voltage signal value. For example, the reference voltages with a positive polarity can be set to VH255, VH248, VH232, . . . , VH16, and VH0, and the reference voltages with a negative polarity can be set to VL0, VL16, . . . , VL248, and VL255. The reference voltage values input to the source driver of the present example can be set so that, for example, the output of the voltage value illustrated in FIG. 10 or 12 should be satisfied.

Figure 17:
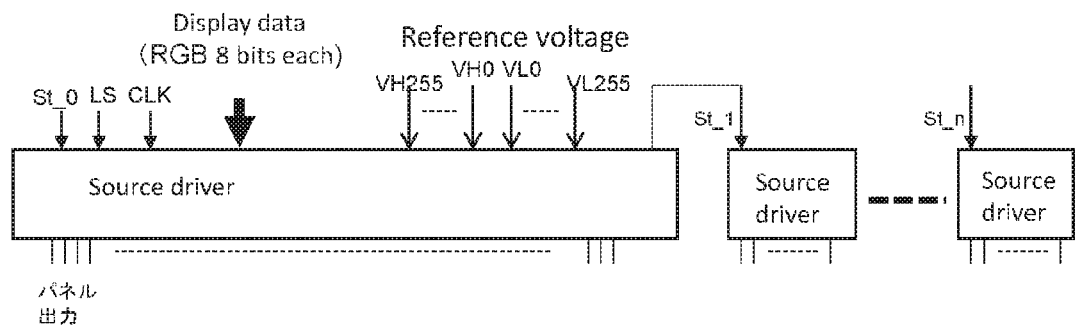
FIG. 17 illustrates an exemplary configuration in which a plurality of source drivers are connected in cascade.

Next, the source driver 24 is described. The source driver 24 is, for example, formed with a plurality of source drivers 24 connected in cascade, as illustrated in FIG. 17. When a St_0 signal is input to the first stage of the source driver 24, voltage signal value data are stored within the source driver 24 at every CLK. When data for the number of outputs of the source driver 24 are accumulated, a St_1 signal is sent to the next source driver. In the foregoing next source driver, which has received the St_1 signal, voltage signal value data are stored. After data are stored in each source driver, at a timing when voltages corresponding to the voltage signal value data for one horizontal period are output to the panel, an LS signal is input. When the LS signal is input, output voltage values based on the reference voltages with respect to voltage signal value data are output to the source lines. In the output from the source driver 24, three outputs correspond to one pixel. To the pixel arrays of R pixels, G pixels, and B pixels, respective voltages are output through three source lines for each array.

Upon output from the source driver 24, a voltage having a polarity that is determined by 0, 1 of the REV signal is output to the source line. In the present embodiment, the source driver 24 operates so that outputs to three consecutive source lines have the same polarity. In other words, the design is such that by the operation of the source driver, the polarity is reversed every three outputs. As illustrated in FIG. 16, upon the input to the source driver 24, data transfer to the source driver 24 is performed by tripling the clock frequency and the display data transfer. The output of the source driver 24 is output in such a manner that the output polarity is reversed every three outputs. Further, the driving may be performed in such a manner that the REV signal is reversed every horizontal period and the polarity of the pixel is reversed every line. Still further, the polarity is reversed every frame, whereby the dot inversion driving is realized.

Figure 18:
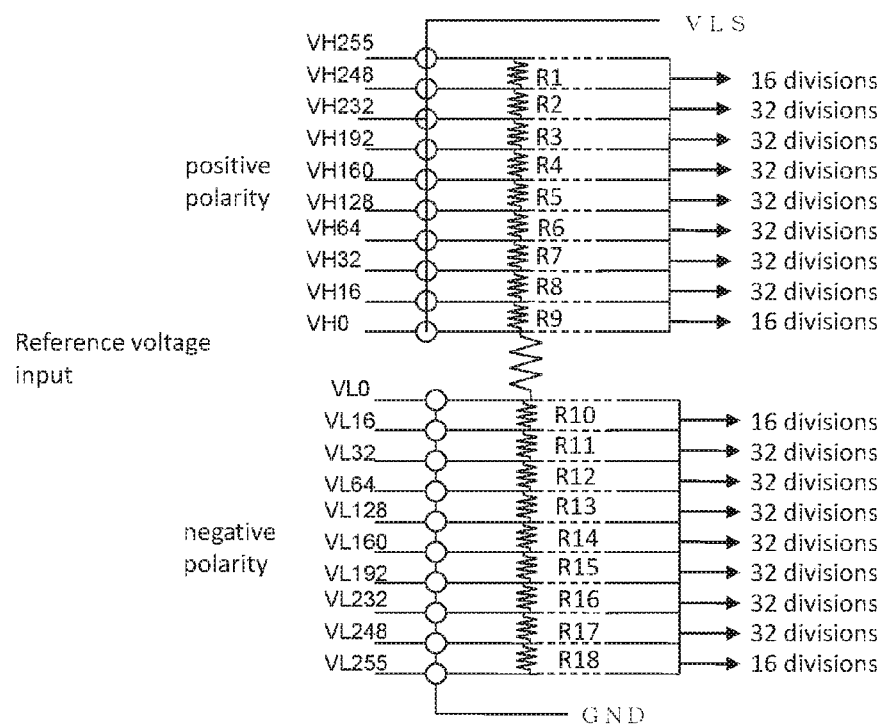
FIG. 18 is an exemplary configuration of a ladder in a source driver.

Further, the voltage output of each voltage signal value (D/A conversion) is performed in such a manner that each reference voltage input to the source driver is divided by the resistance ladder in the source driver (or capacity divider), and are output as voltages corresponding to the voltage signal values. FIG. 18 illustrates an exemplary configuration of a resistance ladder in the source driver. In an example illustrated in FIG. 18, voltage signal value data are converted into voltage values by the resistance ladder, and are output to source lines.

More specifically, positive polarity voltages corresponding to the voltage signal values 255, 248, 232, ... 16, 0 are input to the ladder as reference voltages VH255, VH248, VH232, ... , VH16, VH0. Further, negative polarity voltages corresponding to the voltage signal values 0, 16, 32, ..., 248, 255 are input to the ladder as reference voltages VL0, VL16, ..., VL248, VL255. For example, the positive polarity voltage of the voltage signal value 254 is a voltage one level below the reference voltage of VH255, among voltages obtained by dividing the range between the reference voltage VH255 and the reference voltage VH248 into 16 levels.

Effects of Embodiment

In the liquid crystal display device 10 of the present embodiment, in the display mode of liquid crystal driving with four electrodes, three electrodes are subjected to voltage control by the above-described driving method and voltage setting method. With this configuration, the transmittance (luminance) in white display and contrast can be improved, and further, in gradation display, the transition of display gray levels in low gray level ranges can be made smooth.

Figure 19:
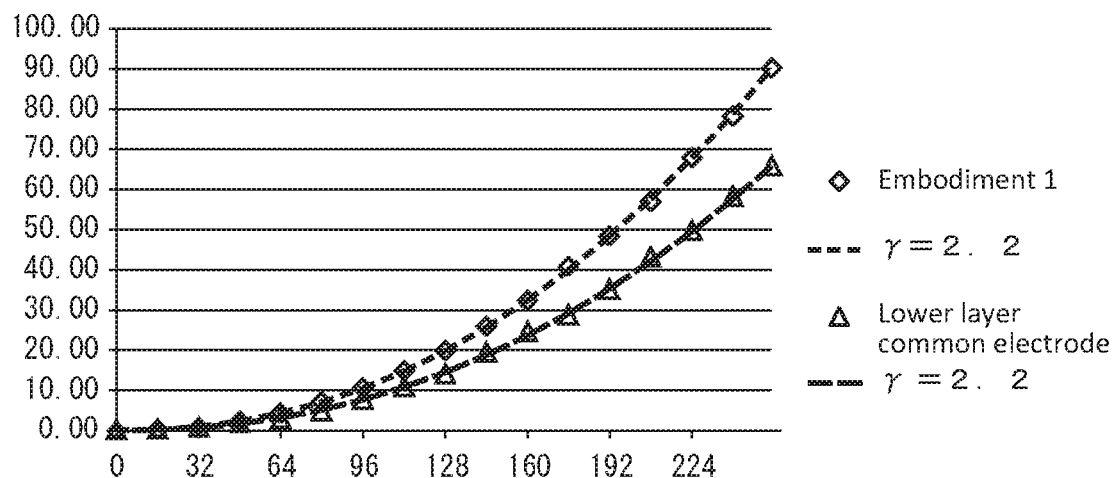
FIG. 19 illustrates properties of panel output luminance with respect to display gray level inputs in the liquid crystal display device 10 in the present embodiment, panel output luminance in a case where a common pixel electrode is used.
Figure 20:
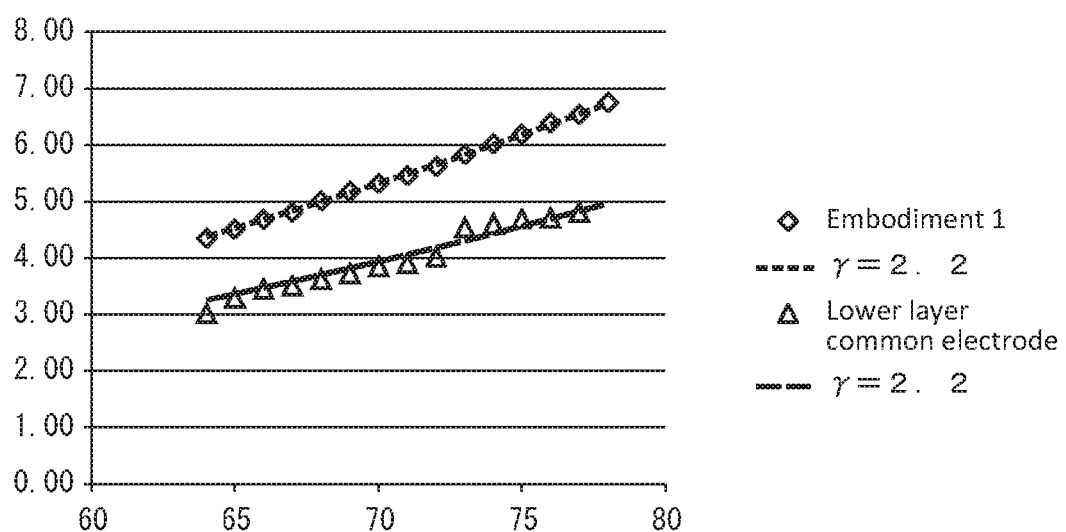
FIG. 20 is an enlarged view of a part of the graph illustrated in FIG. 19 in the vicinities of a gray level of 70.

FIG. 19 is a graph illustrating properties of panel output luminance with respect to each display gray level input in a case where the above-described liquid crystal display device 10 is driven. In FIG. 19, the horizontal axis indicates display input data, and the vertical axis indicates panel output luminance. Square plots indicate panel output luminance values with respect to display gray level inputs in the liquid crystal display device 10. Triangle plots indicate panel output luminance values with respect to display gray level inputs in a case where an electrode common for all of the pixels in the display region is provided as a pixel electrode, i.e., a lower layer electrode. FIG. 20 is an enlarged view of vicinities of the gray level of 70 in the graph of FIG. 19.

As illustrated in the graph of FIG. 19, the case of the present embodiment and the case where a common electrode is used as the lower layer electrode have the same black luminance and the same voltage value (voltage range) of the source driver, but have different white luminance (luminance at the gray level of 255). In other words, with the driving method of the present embodiment in which the pixel electrode 36 is controlled by every gray level, some gray levels do not match $\gamma=2.2$, as compared with the case where a common electrode is used as the pixel electrode (lower layer electrode). In contrast, with the driving method of the present embodiment, it is possible to allow substantially all the gray levels to match $\gamma=2.2$. More specifically, the voltage of the pixel electrode below the pair of drive electrodes is controlled pixel by pixel so that the voltage of the pixel electrode is changed according to the gray level, whereby the voltage setting for achieving desired gamma value properties is facilitated. Further, in the liquid crystal display of the present embodiment, liquid crystal response properties are improved owing to the display mode with use of four electrodes, fast response is enabled even at a low temperature, and the display quality is improved.

Embodiment 2

Figure 21:
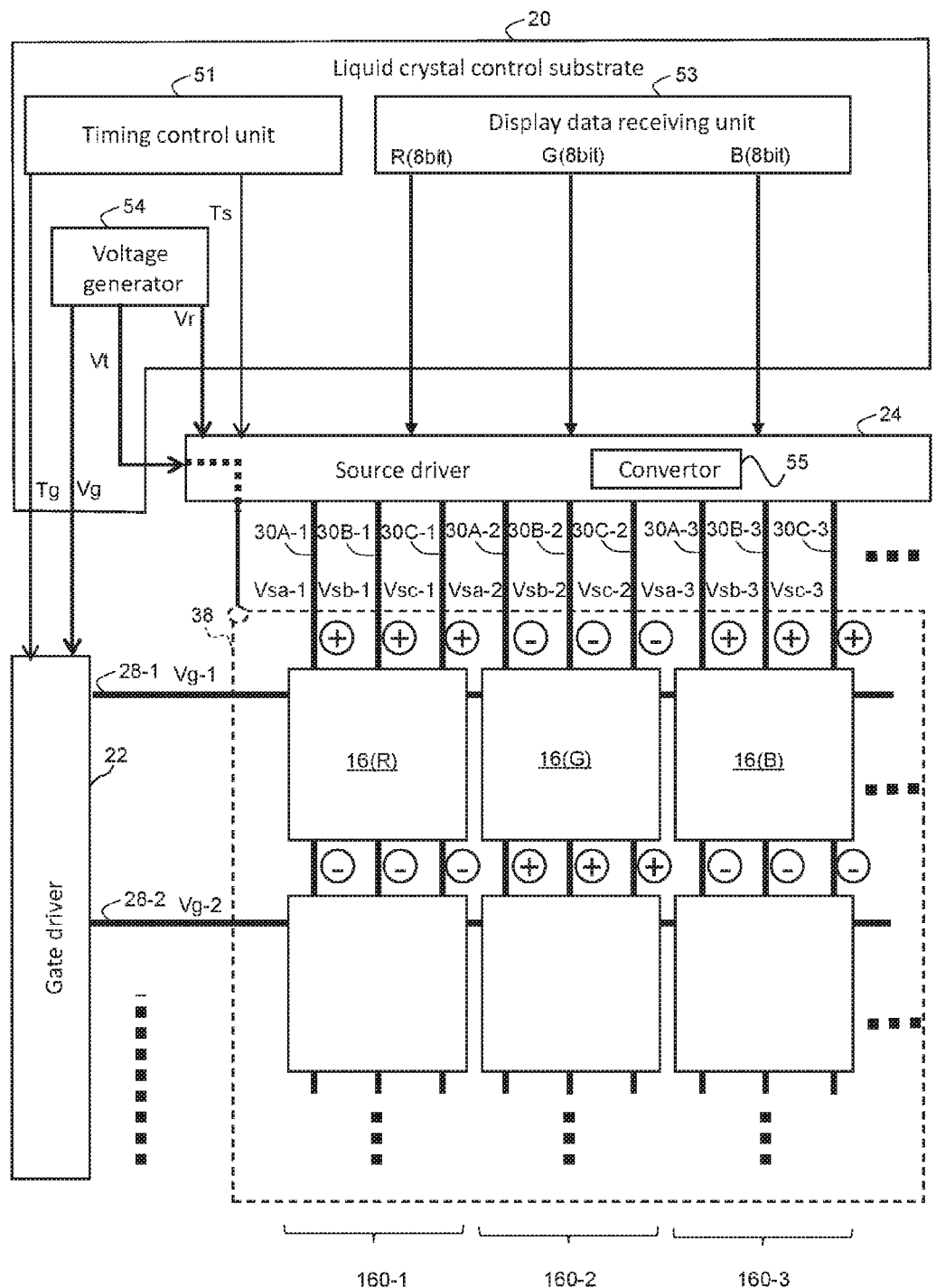
FIG. 21 is a functional block diagram illustrating an exemplary configuration of a liquid crystal display device 10 in Embodiment 2.

FIG. 21 illustrates an exemplary configuration of the liquid crystal display device 10 in embodiment 2. In the example illustrated in FIG. 21, the configuration is such that the source driver 24 converts a display gray level value of each pixel indicated by display data input thereto, into respective voltage signal values of three electrodes, i.e., the drive electrode 32A, the drive electrode 32B, and the pixel electrode 36. More specifically, in the liquid crystal control substrate 20, data conversion for each electrode is not performed, but display data (display gray level values) of respective colors (R, G, B) input thereto are input to the source driver 24 without any change. In the source driver 24, a convertor 55 for performing data conversion of the display gray level values into voltage signal values for the above-described three electrodes is provided. This allows the source driver 24 to have resistance ladders that correspond to the LUT or the above-described three electrodes, respectively.

Figure 22:
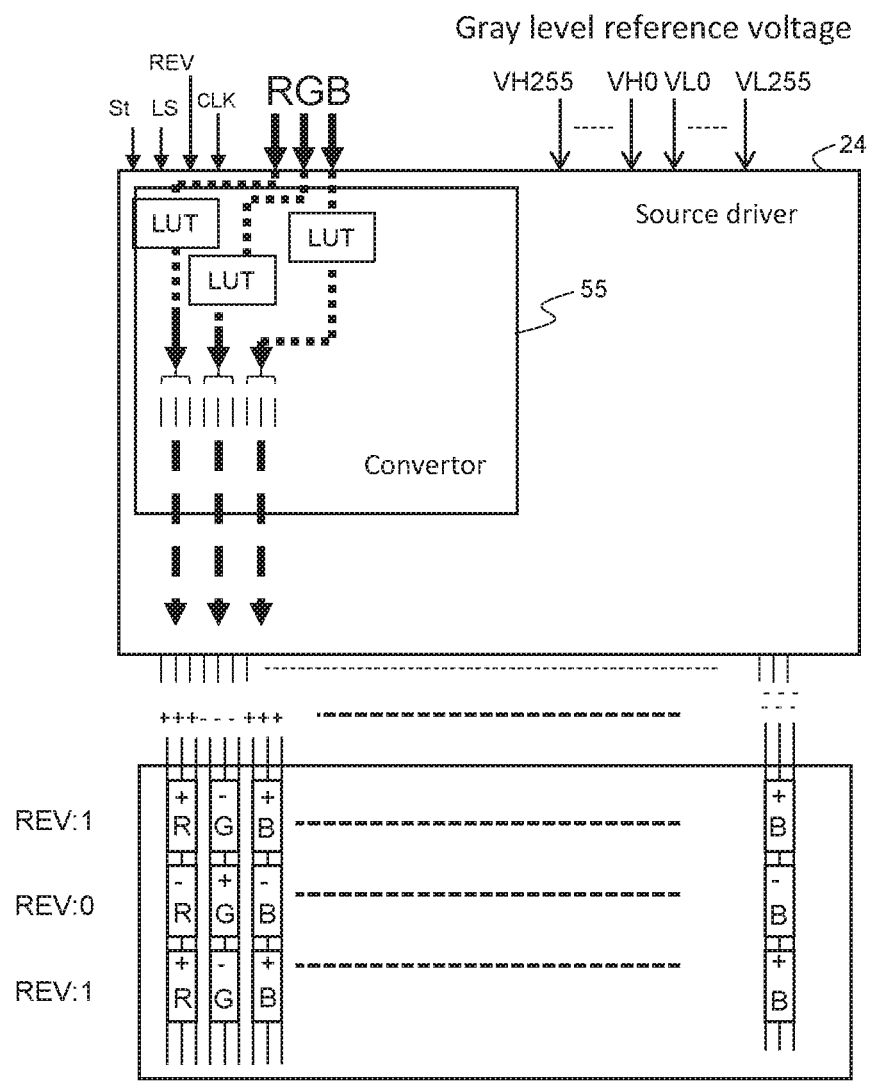
FIG. 22 is a diagram for explaining an operation of a source driver 24.

FIG. 22 is a diagram for explaining the operation of the source driver 24. In an example illustrated in FIG. 22, display gray level values for R, G, B are input as display data to the source driver 24. The source driver 24 includes a convertor 55 having an LUT. The convertor 55 converts the display gray level value into respective voltage signal values for the above-described three electrodes. The source driver 24 generate voltages corresponding to the converted voltage signal values, by using the reference voltages, and outputs the same to the source lines connected to the above-described three electrodes.

The example illustrated in FIG. 22 has such a configuration that conversion is performed with use of the LUT. In contrast, the source driver 24 may be provided with three types of ladders corresponding to the above-described three electrodes. In this case, the foregoing three types of ladders can generate voltage values to be supplied to the above-described three electrodes, respectively, by using the three types of gray level reference voltages corresponding to the above-described three electrodes, as well as the display gray level value input thereto.

For example, the following ladders can be provided in the source driver 24: a ladder for the drive electrode 32A, for outputting a voltage for the drive electrode 32A corresponding to the input display gray level value; a ladder for the drive electrode 32B, for outputting a voltage for the drive electrode 32B corresponding to the input display gray level value; and a ladder for the pixel electrode 36, for outputting a voltage for the pixel electrode 36 corresponding to the input display gray level value. When a display gray level value for one pixel is input, three voltages corresponding to the pair of drive electrodes 32A, 32B and the pixel electrode of the pixel are generated by these ladders. In this way, with one circuit for converting gray level value data into a voltage signal, voltages for three electrodes can be generated from a gray level value for one pixel.

Embodiment 3

Figure 23:
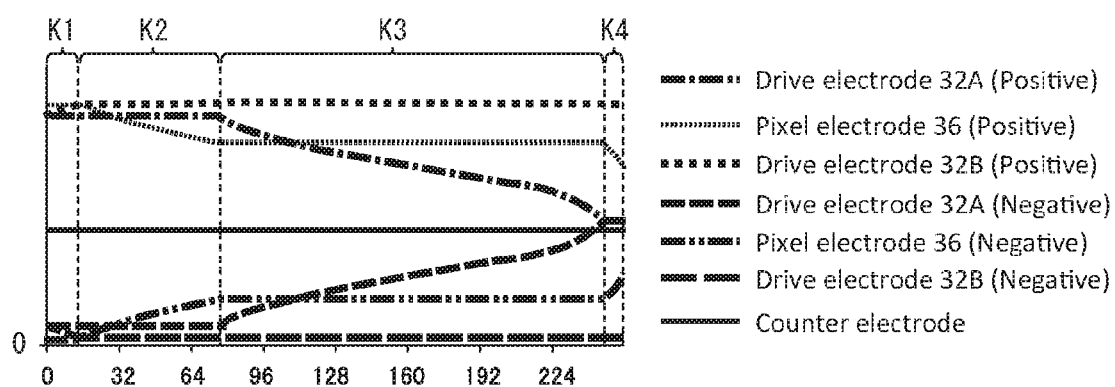
FIG. 23 is a graph illustrating an exemplary voltage setting for three electrodes, regarding each gray level, in Embodiment 3.

FIG. 23 is a graph illustrating an exemplary voltage setting for three electrodes, i.e., the drive electrodes 32A, 32B and the pixel electrode 36, regarding each gray level, in Embodiment 3. In the example illustrated in FIG. 23, in Embodiments 1 and 2, the voltage setting method is controlled so that at each gray level, all of the voltages of the above-described three electrodes are changed. In contrast, the liquid crystal display device 10 of the present embodiment has such a configuration that gray levels are divided into a plurality of ranges, and in each range, one or two of the voltages for the above-described three electrodes are fixed, and the voltage(s) of the other electrode(s) is/are changed according to the gray level.

In the example illustrated in FIG. 23, all gray levels are divided into four ranges, which are a very low gray level range K1, a low gray level range K2, an intermediate gray level range K3, and a high gray level range K4. The liquid crystal display device 10, in each gray level range, changes a voltage of only one electrode among the above-described three electrodes, according to the gray level. More specifically, in the very low gray level range K1, the drive electrode 32B has a voltage change according to the gray level, and the voltages of the other electrodes do not change. In the low gray level range K2, the voltage of the pixel electrode 36 changes according to the gray level. In the intermediate gray level range K3, the voltage of the drive electrode 32A changes. In the high gray level range K4, again, the voltage of the pixel electrode 36 changes according to the gray level. In other words, in this example, the configuration is as follows: all of the gray levels are classified into a plurality of consecutive ranges, then in each range, a voltage signal value of one of the pair of drive electrodes 32A, 32B and the pixel electrode 36 is specified, and the voltage signal value for the specified one is adjusted.

To realize the above-described driving, for example, an LUT as illustrated in FIG. 23 that shows correspondence between the display gray level values and the voltages of the above-described three electrodes can be recorded in advance. The convertor 55 generates the gray level values or the voltage values of the above-described three electrodes by referring to the LUT, thereby enabling the above-described driving.

By setting a voltage for each electrode in this way, gradation change of the display output luminance can be made smooth (so as to match γ=2.2). For example, by fixing the voltage of any of the three electrodes with respect to a part of the entire gray levels, an optimal voltage value for realizing luminance that matches the desired γ curve can be found easily.

The example illustrated in FIG. 23 is in such a configuration that, in all of the four ranges K1 to K4, a voltage of only one of the above-described three electrodes is changed, but the configuration of voltage change of each electrode is not limited to this. For example, the configuration may be such that in at least one range among the four ranges K1 to K4, a voltage of only one electrode is changed. Further, the manner of dividing the range is not limited to the division into the four ranges K1 to K4 as illustrated in FIG. 23.

Embodiment 4

Figure 24:
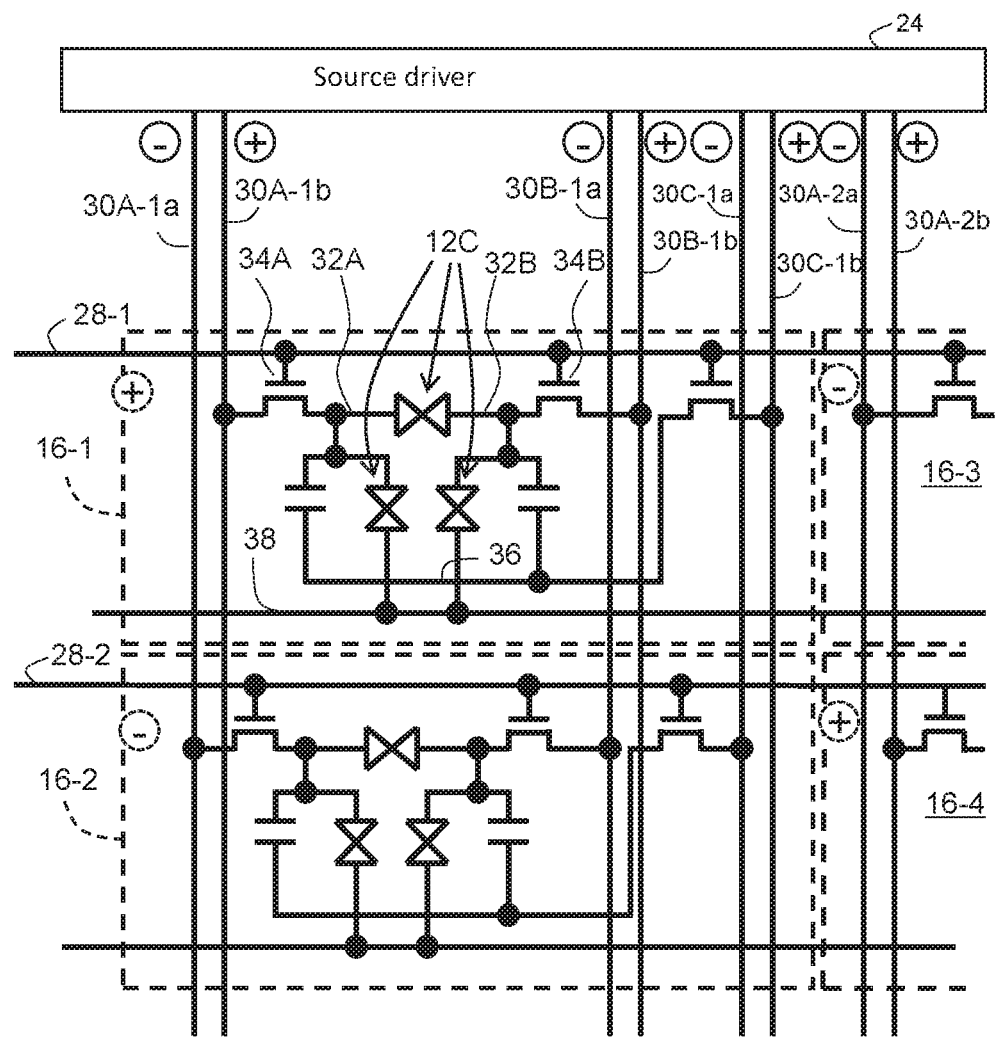
FIG. 24 illustrates an exemplary wiring configuration of a liquid crystal display device 10 in Embodiment 4.

FIG. 24 illustrates an exemplary wiring configuration of the liquid crystal display device 10 in Embodiment 4. In the example illustrated in FIG. 24, for a pixel array extending along the source line, two first source lines 30A, two second source lines 30B, and two third source lines 30C are provided. The two first source lines 30A-1a, 30A-1b are connected to two pixels 16-1, 16-2, respectively, the two pixels being adjacent to each other in the scanning direction of the gate lines 28-1, 28-2 for this pixel array. In other words, the first source line 30A-1b as one of the two source lines is connected to the TFT 34A of the pixel 16-1, and the other first source line 30A-1a is connected to the pixel 16-2 adjacent to the pixel 16-1 in the pixel array, that is, adjacent in the gate signal scanning direction. To these two first source lines 30A-1a, 30A-1b, voltages having different polarities are simultaneously input. Here, the two adjacent gate lines corresponding to the pixel array are simultaneously selected. In other words, the gate line 28-1 connected to the pixel 16-1 to which one of the two first source lines 30A-1a, 30A-1b is connected, and the gate line 28-2 connected to the pixel 16-2, which is adjacent to the foregoing pixel in the gate line scanning direction, can be simultaneously selected.

The two second source lines 30B-1a, 30B-1b for each pixel array are connected to the two adjacent pixels 16-1 and 16-2, respectively, the pixels being adjacent to each other in the scanning direction of the gate lines 28-1, 28-2 for the pixel array. To these two second source lines 30B-1a, 30B-1b, voltages having different polarities are simultaneously input.

The two third source lines 300-1a, 300-1b for each pixel array are connected to the two adjacent pixels 16-1 and 16-2, respectively, the pixels being adjacent to each other in the scanning direction of the gate lines 28-1, 28-2 for the pixel array. To these two third source lines 300-1a, 30C-2, voltages having different polarities are simultaneously input.

Further, to the two source lines adjacent to each other, voltages having different polarities are simultaneously input. For example, to the first source line 30A-1b, a voltage having a positive polarity is applied, and to the first source line 30A-1a and the second source line 30B-1a adjacent to the first source line 30A-1b, a voltage having a negative polarity is input simultaneously. In other words, to a plurality of source lines 30A-1a, 30A-1b, 30B-1a, 30B-1b, . . . , which are aligned in the direction of the gate lines 28, a voltage having a positive polarity and a voltage having a negative polarity are alternately and simultaneously input.

Further, to the two adjacent first source lines 30A-1*b*, 30A-2*a* for the pixels 16-1, 16-3, which are aligned in a direction perpendicular to the direction in which the first source line 30A extends, voltages having different polarities are simultaneously input, respectively. In a case, for example, a voltage having a positive polarity and a voltage having a negative polarity are alternately input to a plurality of source lines, such a wiring layer can be achieved that voltages having different polarities are supplied, respectively, to the first source lines for two pixels adjacent to each other in the direction along the gate line 28. This allows the dot inversion driving to be performed efficiently.

In the example illustrated in FIG. 24, the polarity of the voltage can be changed one by one of the source lines consecutively arranged. In other words, among the plurality of source lines, the polarity of the voltage for the even-number-th source lines, and the polarity of the voltage for the odd-number-th source lines, can be made different from each other. This makes it easier to use an existing source driver. Consequently, it is possible to reduce costs.

Embodiment 5

Figure 25:
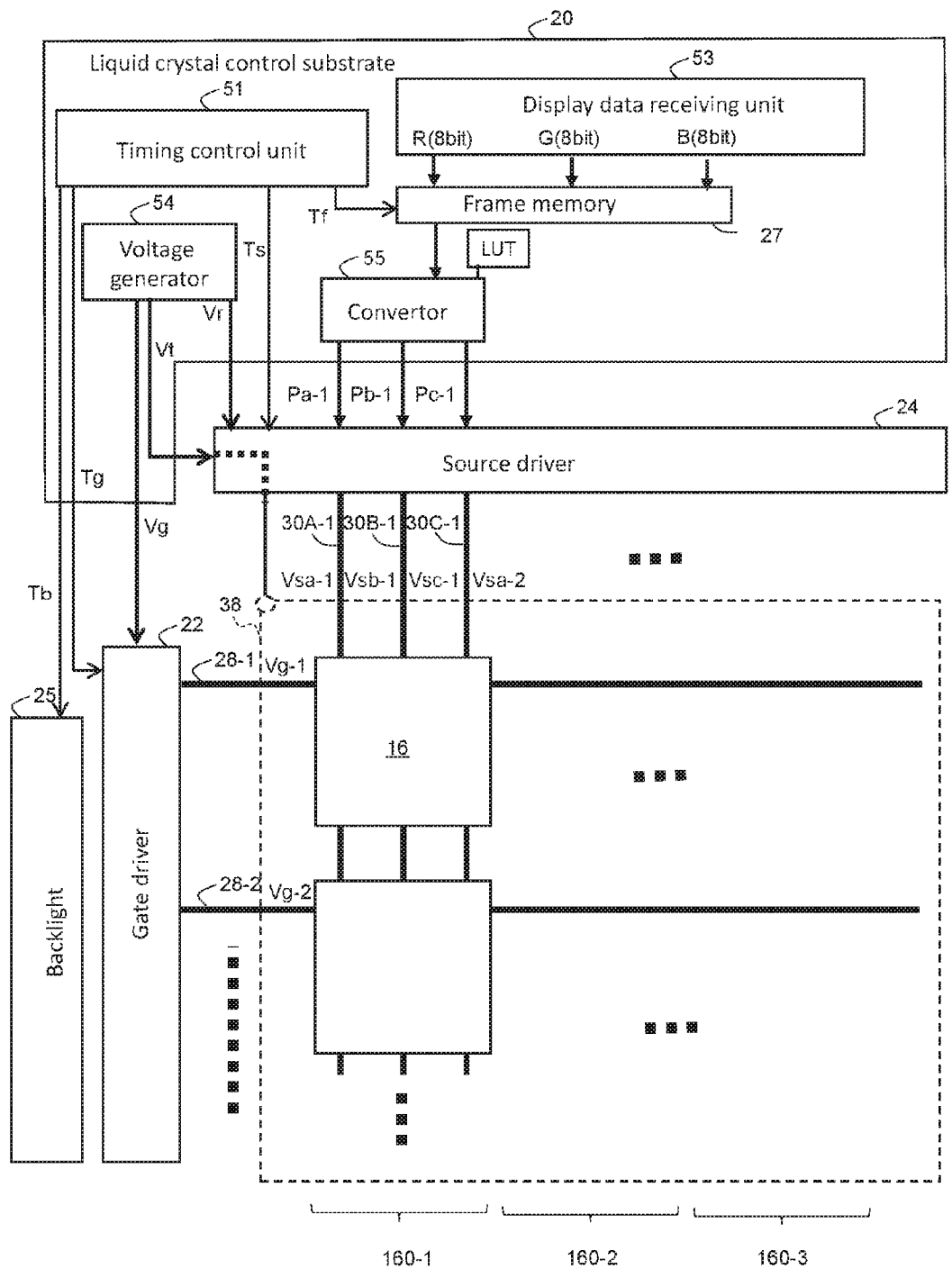
FIG. 25 is a functional block diagram illustrating an exemplary wiring configuration of a liquid crystal display device 10 in Embodiment 5.

FIG. 25 illustrates an exemplary wiring configuration of the liquid crystal display device 10 in Embodiment 5. The liquid crystal display device 10 illustrated in FIG. 25 performs a driving operation in which one frame period is time-divided, and images with different colors are switched and displayed by every time-divided period, which is so-called field sequential driving.

In the example illustrated in FIG. 25, RGB data that indicate display gray level values of R, G, and B in one frame, which are input as display data, are stored in a frame memory 27. One frame period is time-divided into a plurality of fields corresponding to the colors of R, G, and B. In each field period, data indicating a gray level value of an image of the corresponding color are read out of the frame memory 27 and are displayed. For example, the field sequential driving with sub-frames that are three times or more can be performed. The timing control unit 51 transmits timing signals Tf, Ts, Tg, and Tb to the frame memory 27, the source driver 24, the gate driver 22, and a backlight 25, in order to synchronize the timing for emitting light of each color using the backlight, with the timing for displaying each color image.

The convertor 55 converts a display gray level value for each pixel read out of the frame memory 27 into a voltage signal value or a voltage value for each of the three electrodes, i.e., the drive electrode 32A, the drive electrode 32B, and the pixel electrode 36. For the configuration of the convertor 55, the source driver 24, the source lines 30, the gate lines 28, and the pixels 16, any one of the configurations of Embodiments 1 to 4 described above, or a configuration of combination of at least two of Embodiments 1 to 4, can be used.

In this way, in the case where the liquid crystal display device is used in the field sequential display, the driving is performed, in a case of three colors, at a refresh rate that is at least three times. High speed response is needed for this purpose. In the liquid crystal display mode of the present embodiment, high speed response can be performed. Performing the field sequential driving with a liquid crystal display device of any one of Embodiments 1 to 4 described above makes it possible to perform field sequential display with less color mixing.

Embodiments of the present invention are described in detail above, but these are merely examples. The present invention is not limited by the embodiments described above at all. For example, in Embodiments 1 to 3, the liquid crystal molecules have positive dielectric anisotropy, but the liquid crystal molecules may have negative dielectric anisotropy.

The invention claimed is:

1. A liquid crystal display device comprising:
   an active matrix substrate having a display region in which a plurality of pixel arrays are arranged, each pixel array being formed with a plurality of pixels aligned;
   a counter substrate arranged so as to be opposed to the active matrix substrate; and
   a crystal layer sealed between the active matrix substrate and the counter substrate,
   wherein the active matrix substrate includes:
      drive electrodes, a pair of which are arranged in each pixel on an insulating layer;
      pixel electrodes, each of which is provided in each pixel on a side opposite to the pair of drive electrodes, with the insulating layer being interposed there between;
      first switching elements, each of which is connected to one of the pair of drive electrodes in each pixel;
      second switching elements, each of which is directly connected to the other of the pair of the drive electrodes in each pixel;
      third switching elements, each of which is directly connected to the pixel electrode in each pixel;
      first source lines, each of which is provided in each pixel array; the first source line being connected to a group of the first switching elements of a group of the pixels included in each pixel array;
      second source lines, each of which is provided in each pixel array; the second source line being connected to a group of the second switching elements of the group of the pixels included in each pixel array;
      third source lines, each of which is provided in each pixel array; the third source line being directly connected to a group of the third switching elements of the group of the pixels included in each pixel array; and
      a plurality of gate lines, each of which supplies a control signal to the first switching element, the second switching element, and the third switching element of each pixel, and
   the counter substrate includes a counter electrode arranged so as to be opposed to the pixel electrode and the pair of drive electrodes.

2. The liquid crystal display device according to claim 1, further comprising:
   a control unit that causes the display region to display an image,
   wherein, with respect to each pixel, the control unit independently supplies a voltage corresponding to a gray level to be displayed on the pixel, via the first source line, the second source line, and the third source line, to the pair of drive electrodes and the pixel electrode.

3. The liquid crystal display device according to claim 2, wherein the control unit includes a convertor that generates voltage values corresponding to voltages to be applied to the pair of drive electrodes and the pixel electrode in each pixel, based on a display gray level value indicating a gray level to be displayed on each pixel.

4. The liquid crystal display device according to claim 3, wherein the control unit includes a conversion value recording section that records all gray level values that indicate all gray levels that can be displayed on the pixel, voltage values of the pair of drive electrodes corresponding to all the gray level values, and voltage values of the pixel electrode corresponding to all the gray level values, and the convertor determines respective voltage values of the pair of drive electrodes corresponding to the display gray level value, and a voltage value of the pixel electrode corresponding to the display gray level value, by referring to the conversion value recording section.

5. The liquid crystal display device according to claim 3, wherein the convertor includes:

a drive electrode voltage generation circuit that outputs a voltage value that serves as a reference value for the voltage values of the pair of drive electrodes corresponding to the display gray level value; and a pixel electrode voltage generation circuit that outputs a voltage value that serves as a reference value for the voltage value of the pixel electrode corresponding to the display gray level value.

6. The liquid crystal display device according to claim 3, wherein the convertor generates the voltage values in such a manner that at least one of the voltage value of one of the pair of drive electrodes, the voltage value of the other one of the pair of drive electrodes, and the voltage value of the pixel electrode is constant in a part of a range of all the gray levels that can be displayed by the pixel.

7. The liquid crystal display device according to claim 1, wherein two of the first source lines, two of the second source lines, and two of the third source lines are provided for each pixel array, the two first source lines in each pixel array are connected to two adjacent ones of the pixels in the pixel array, respectively, and voltages having different polarities are input simultaneously to the two first source lines, respectively, the two second source lines in each pixel array are connected to two adjacent ones of the pixels in the pixel array, respectively, and voltages having different polarities are input simultaneously to the two second source lines, respectively, and the two third source lines in each pixel array are connected to two adjacent ones of the pixels in the pixel array, respectively, and voltages having different polarities are input simultaneously to the two third source lines, respectively.

8. The liquid crystal display device according to claim 7, wherein voltages having different polarities are simultaneously input to two adjacent lines, respectively, among the two first source lines, the two second source lines, and the two third source lines provided in each pixel array, and voltages having different polarities are simultaneously input to the first source lines of two adjacent pixels, respectively, the two pixels being adjacent in a direction perpendicular to the direction in which the first source lines extend.

9. The liquid crystal display device according to claim 1, wherein the control unit time-divides one frame period, and switches and displays images of different colors in each period thus time-divided.

10. The liquid crystal display device according to claim 1, wherein the first switching element, the second switching element, and the third switching element are formed with thin film transistors, each of the thin film transistors includes a semiconductor layer that includes an oxide semiconductor provided at a position opposed to the electrode connected to the gate line, a first electrode connected to one of the pair of drive electrodes or the pixel electrode, and a second electrode connected with the source line, and the first electrode and the second electrode are formed so as to be separated from each other on the semiconductor layer.

* * * * *